US008542664B2

(12) United States Patent
Michel et al.

(10) Patent No.: US 8,542,664 B2

(45) Date of Patent: Sep. 24, 2013

(54) CODE SEQUENCE AND RADIO STATION

(75) Inventors: Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 574 days.

(21) Appl. No.: 11/884,368

(22) PCT Filed: Feb. 6, 2006

(86) PCT No.: PCT/EP2006/050677

§ 371 (c)(1), (2), (4) Date: Aug. 15, 2007

(87) PCT Pub. No.: WO2006/087270

PCT Pub. Date: Aug. 24, 2006

(65) Prior Publication Data

US 2008/0137617 A1 Jun. 12, 2008

(30) Foreign Application Priority Data

Feb. 15, 2005 (DE) ........................ 10 2005 006 893

(51) Int. Cl.

*H04B 7/216* (2006.01)

(52) U.S. Cl.

USPC ............................ 370/342; 370/335; 370/441

(58) Field of Classification Search

USPC ................. 370/310, 328, 329, 335, 342, 431, 370/437, 441, 464, 465, 479

See application file for complete search history.

(56) References Cited

U.S. PATENT DOCUMENTS

| | | | |
|---|---|---|---|
| 4,577,402 | A | 3/1986 | Swanstrom |
| 5,151,919 | A | 9/1992 | Dent |
| 5,721,667 | A | 2/1998 | Rose |
| 5,751,761 | A | 5/1998 | Gilhousen |
| 5,969,937 | A | 10/1999 | Rose et al. |
| 6,091,760 | A | 7/2000 | Giallorenzi et al. |
| 6,226,184 | B1 | 5/2001 | Stolz et al. |
| 6,466,142 | B1 | 10/2002 | Barbano |
| 6,724,741 | B1 | 4/2004 | Nieczyporowicz et al. |
| 6,813,307 | B1 * | 11/2004 | Cohen et al. .................. 375/145 |
| 2006/0098679 | A1 * | 5/2006 | Cheng et al. .................. 370/441 |
| 2008/0137617 | A1 | 6/2008 | Michel et al. |

FOREIGN PATENT DOCUMENTS

EP 1 055 996 A2 11/2000

OTHER PUBLICATIONS

Gerakoulis et al.; "Extended Orthogonal Code Designs with Applications in CDMA", IEEE Sixth International Symposium on Spread Spectrum Techniques and Applications; Sep. 2000, vol. 2, pp. 657-661.

International Search Report for Application No. PCT/EP2006/050677; mailed Apr. 28, 2006.

Siemens, E-HICH/E-RGCH Signature Sequences, 3GPP TSG RAN WG1 Meeting #40, R1-050090, Feb. 2005, 3 pp.

(Continued)

*Primary Examiner* — Michael Thier

*Assistant Examiner* — Feben M Haile

(74) *Attorney, Agent, or Firm* — Staas & Halsey LLP

(57) ABSTRACT

A code sequence is described by a line of a code matrix, the latter being obtained by formation of a Hadamard matrix with a length n and multiplication of lines of the Hadamard matrix by −1.

11 Claims, 3 Drawing Sheets

(56) References Cited

OTHER PUBLICATIONS

3GPP TS 25.211 V6.3.0 (Dec. 2004), 3rd Generation Partnership Project; Technical Specification Group Radio Access Network; Physical channels and mapping of transport channels onto physical channels (FDD) (Release 6), Dec. 2012.

3GPP RAN1#40, R1-050116, E-HICH/E-RGCH Peak Power Requirement, Motorola, Feb. 2005.

3GPP TSG RAN WG1 Meeting #40, R1-050090, E-HICH/E-RGCH Signature Sequences, Siemens, Feb. 2005.

* cited by examiner

FIG 2

| | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| $c_{SS,40,0}$ | -1 | -1 | -1 | 1 | -1 | 1 | -1 | -1 | 1 | 1 | -1 | -1 | 1 | -1 | 1 | 1 | -1 | 1 | 1 | -1 | -1 | -1 | -1 | -1 | -1 | -1 | -1 | 1 | -1 | 1 | -1 | -1 | 1 | 1 | 1 | 1 | 1 | -1 | -1 | -1 |
| $c_{SS,40,1}$ | -1 | 1 | 1 | -1 | -1 | 1 | 1 | 1 | -1 | -1 | 1 | -1 | 1 | 1 | -1 | -1 | -1 | -1 | 1 | 1 | -1 | -1 | -1 | -1 | -1 | 1 | -1 | -1 | -1 | -1 | -1 | -1 | -1 | 1 | 1 | -1 | 1 | 1 | -1 | -1 |
| $c_{SS,40,2}$ | -1 | -1 | -1 | 1 | -1 | 1 | 1 | 1 | -1 | -1 | -1 | -1 | 1 | -1 | -1 | 1 | 1 | -1 | -1 | 1 | 1 | -1 | 1 | 1 | 1 | -1 | -1 | 1 | 1 | 1 | -1 | 1 | -1 | -1 | -1 | -1 | -1 | -1 | -1 | -1 |
| $c_{SS,40,3}$ | 1 | -1 | -1 | -1 | -1 | -1 | -1 | 1 | 1 | 1 | -1 | 1 | -1 | 1 | -1 | 1 | -1 | -1 | -1 | 1 | -1 | 1 | -1 | -1 | 1 | 1 | -1 | 1 | -1 | -1 | 1 | 1 | -1 | -1 | 1 | -1 | -1 | -1 | -1 | -1 |
| $c_{SS,40,4}$ | 1 | 1 | 1 | -1 | -1 | 1 | -1 | 1 | -1 | -1 | 1 | 1 | 1 | -1 | 1 | 1 | 1 | 1 | 1 | 1 | -1 | 1 | 1 | 1 | -1 | -1 | -1 | 1 | 1 | -1 | 1 | -1 | 1 | -1 | 1 | 1 | -1 | 1 | -1 | -1 |
| $c_{SS,40,5}$ | -1 | 1 | -1 | -1 | 1 | 1 | 1 | -1 | 1 | 1 | -1 | 1 | 1 | 1 | -1 | 1 | 1 | 1 | -1 | -1 | 1 | -1 | -1 | 1 | -1 | 1 | -1 | 1 | -1 | -1 | 1 | -1 | 1 | -1 | -1 | -1 | -1 | 1 | 1 | -1 |
| $c_{SS,40,6}$ | 1 | 1 | -1 | -1 | -1 | 1 | 1 | -1 | 1 | 1 | -1 | -1 | 1 | -1 | -1 | -1 | -1 | 1 | 1 | -1 | 1 | 1 | 1 | -1 | 1 | -1 | 1 | -1 | 1 | -1 | -1 | 1 | 1 | -1 | 1 | -1 | -1 | 1 | -1 | 1 |
| $c_{SS,40,7}$ | -1 | 1 | -1 | 1 | 1 | 1 | -1 | -1 | -1 | -1 | -1 | 1 | 1 | 1 | 1 | -1 | -1 | -1 | 1 | -1 | -1 | -1 | 1 | -1 | 1 | 1 | -1 | -1 | 1 | 1 | 1 | 1 | -1 | -1 | 1 | 1 | -1 | 1 | 1 | -1 |
| $c_{SS,40,8}$ | 1 | 1 | -1 | 1 | 1 | -1 | 1 | 1 | 1 | 1 | -1 | -1 | -1 | -1 | 1 | -1 | 1 | -1 | 1 | 1 | 1 | 1 | -1 | 1 | -1 | -1 | -1 | -1 | -1 | 1 | -1 | -1 | -1 | -1 | 1 | 1 | -1 | 1 | 1 | -1 |
| $c_{SS,40,9}$ | -1 | 1 | -1 | -1 | -1 | -1 | 1 | -1 | -1 | -1 | -1 | 1 | -1 | -1 | 1 | 1 | 1 | -1 | 1 | -1 | 1 | -1 | -1 | 1 | 1 | -1 | 1 | 1 | -1 | -1 | 1 | 1 | -1 | 1 | 1 | 1 | 1 | 1 | -1 | 1 |
| $c_{SS,40,10}$ | -1 | 1 | 1 | -1 | 1 | 1 | -1 | 1 | 1 | 1 | 1 | -1 | 1 | -1 | 1 | 1 | -1 | -1 | -1 | 1 | -1 | -1 | -1 | -1 | 1 | -1 | 1 | 1 | -1 | -1 | -1 | 1 | -1 | -1 | -1 | 1 | -1 | 1 | 1 | 1 |
| $c_{SS,40,11}$ | -1 | 1 | -1 | -1 | -1 | -1 | -1 | 1 | 1 | 1 | -1 | -1 | -1 | 1 | 1 | -1 | 1 | 1 | -1 | 1 | -1 | -1 | 1 | 1 | 1 | 1 | -1 | -1 | 1 | -1 | -1 | 1 | 1 | 1 | -1 | 1 | 1 | 1 | -1 | -1 |
| $c_{SS,40,12}$ | -1 | -1 | -1 | -1 | 1 | -1 | 1 | 1 | -1 | -1 | -1 | -1 | -1 | 1 | 1 | 1 | -1 | 1 | 1 | 1 | 1 | -1 | 1 | -1 | -1 | 1 | 1 | 1 | 1 | -1 | -1 | -1 | 1 | -1 | 1 | 1 | -1 | -1 | 1 | 1 |
| $c_{SS,40,13}$ | 1 | 1 | 1 | 1 | -1 | -1 | 1 | -1 | -1 | -1 | 1 | -1 | -1 | 1 | 1 | 1 | -1 | 1 | -1 | -1 | 1 | 1 | -1 | -1 | 1 | 1 | -1 | 1 | -1 | 1 | -1 | 1 | 1 | -1 | -1 | 1 | -1 | 1 | -1 | -1 |
| $c_{SS,40,14}$ | -1 | 1 | 1 | 1 | -1 | -1 | -1 | -1 | 1 | 1 | 1 | -1 | -1 | 1 | -1 | 1 | 1 | -1 | 1 | -1 | -1 | -1 | 1 | 1 | -1 | 1 | 1 | 1 | 1 | 1 | -1 | -1 | -1 | -1 | 1 | -1 | -1 | 1 | -1 | 1 |
| $c_{SS,40,15}$ | -1 | -1 | 1 | 1 | -1 | 1 | 1 | 1 | 1 | 1 | 1 | 1 | 1 | 1 | 1 | -1 | 1 | 1 | 1 | 1 | 1 | -1 | -1 | 1 | 1 | 1 | 1 | -1 | -1 | 1 | 1 | 1 | 1 | -1 | 1 | 1 | -1 | -1 | -1 | 1 |
| $c_{SS,40,16}$ | 1 | -1 | -1 | -1 | -1 | 1 | -1 | -1 | -1 | -1 | -1 | -1 | 1 | 1 | 1 | -1 | 1 | -1 | -1 | -1 | -1 | 1 | -1 | 1 | -1 | 1 | 1 | -1 | -1 | -1 | -1 | -1 | -1 | -1 | -1 | 1 | -1 | -1 | -1 | 1 |
| $c_{SS,40,17}$ | 1 | -1 | 1 | -1 | 1 | 1 | 1 | -1 | 1 | 1 | 1 | -1 | 1 | 1 | 1 | 1 | 1 | -1 | 1 | -1 | 1 | 1 | 1 | 1 | 1 | 1 | -1 | 1 | 1 | -1 | -1 | 1 | -1 | 1 | 1 | 1 | 1 | -1 | 1 | -1 |
| $c_{SS,40,18}$ | 1 | 1 | -1 | 1 | -1 | 1 | 1 | 1 | 1 | 1 | -1 | 1 | 1 | 1 | 1 | 1 | -1 | -1 | -1 | 1 | 1 | 1 | 1 | -1 | -1 | 1 | 1 | 1 | 1 | 1 | 1 | -1 | -1 | 1 | -1 | 1 | 1 | 1 | -1 | 1 |
| $c_{SS,40,19}$ | 1 | 1 | -1 | 1 | 1 | 1 | -1 | 1 | -1 | -1 | -1 | -1 | 1 | 1 | -1 | 1 | 1 | 1 | 1 | 1 | -1 | 1 | -1 | 1 | 1 | 1 | 1 | 1 | -1 | 1 | -1 | 1 | 1 | 1 | 1 | -1 | 1 | 1 | 1 | 1 |
| $c_{SS,40,20}$ | 1 | 1 | 1 | -1 | 1 | 1 | -1 | 1 | -1 | 1 | -1 | 1 | -1 | -1 | -1 | 1 | -1 | -1 | 1 | -1 | 1 | -1 | -1 | 1 | 1 | 1 | 1 | -1 | 1 | 1 | -1 | -1 | 1 | 1 | -1 | 1 | -1 | -1 | -1 | -1 |
| $c_{SS,40,21}$ | -1 | 1 | 1 | -1 | -1 | -1 | -1 | 1 | -1 | 1 | -1 | -1 | 1 | -1 | -1 | 1 | 1 | -1 | -1 | -1 | 1 | 1 | 1 | -1 | -1 | 1 | -1 | -1 | -1 | 1 | 1 | 1 | 1 | -1 | 1 | 1 | 1 | -1 | 1 | 1 |
| $c_{SS,40,22}$ | -1 | -1 | -1 | 1 | -1 | -1 | -1 | 1 | -1 | 1 | 1 | -1 | 1 | 1 | -1 | -1 | -1 | -1 | 1 | -1 | 1 | 1 | -1 | 1 | 1 | -1 | -1 | 1 | 1 | -1 | 1 | -1 | 1 | 1 | -1 | 1 | -1 | 1 | 1 | 1 |
| $c_{SS,40,23}$ | 1 | -1 | -1 | -1 | -1 | 1 | 1 | 1 | 1 | -1 | 1 | 1 | -1 | -1 | -1 | -1 | 1 | -1 | -1 | -1 | -1 | -1 | 1 | -1 | 1 | 1 | -1 | 1 | -1 | 1 | -1 | -1 | 1 | 1 | 1 | 1 | -1 | 1 | 1 | 1 |
| $c_{SS,40,24}$ | -1 | -1 | -1 | 1 | 1 | 1 | -1 | -1 | 1 | -1 | 1 | -1 | -1 | -1 | -1 | 1 | 1 | -1 | 1 | 1 | 1 | 1 | 1 | -1 | 1 | 1 | 1 | -1 | -1 | -1 | 1 | -1 | 1 | -1 | -1 | 1 | 1 | 1 | -1 | -1 |
| $c_{SS,40,25}$ | -1 | 1 | -1 | -1 | 1 | -1 | -1 | -1 | 1 | -1 | 1 | 1 | 1 | -1 | -1 | -1 | -1 | 1 | 1 | 1 | 1 | 1 | 1 | 1 | -1 | 1 | -1 | 1 | -1 | 1 | -1 | 1 | -1 | 1 | -1 | 1 | -1 | -1 | -1 | 1 |
| $c_{SS,40,26}$ | -1 | -1 | 1 | 1 | 1 | 1 | 1 | 1 | -1 | 1 | -1 | 1 | -1 | -1 | 1 | -1 | -1 | -1 | 1 | -1 | -1 | 1 | 1 | 1 | -1 | 1 | -1 | 1 | -1 | -1 | -1 | 1 | 1 | -1 | -1 | -1 | 1 | 1 | -1 | 1 |
| $c_{SS,40,27}$ | 1 | -1 | 1 | -1 | -1 | 1 | -1 | 1 | 1 | -1 | -1 | -1 | -1 | 1 | -1 | -1 | -1 | 1 | 1 | -1 | 1 | -1 | 1 | 1 | -1 | -1 | 1 | 1 | -1 | 1 | 1 | 1 | -1 | -1 | -1 | 1 | 1 | 1 | 1 | -1 |
| $c_{SS,40,28}$ | 1 | 1 | -1 | 1 | 1 | 1 | -1 | 1 | 1 | -1 | 1 | -1 | -1 | 1 | 1 | 1 | -1 | -1 | -1 | -1 | 1 | -1 | 1 | 1 | -1 | -1 | -1 | -1 | -1 | -1 | 1 | 1 | 1 | 1 | 1 | -1 | -1 | -1 | -1 | 1 |
| $c_{SS,40,29}$ | -1 | 1 | -1 | -1 | -1 | 1 | -1 | -1 | -1 | 1 | 1 | 1 | -1 | 1 | 1 | -1 | -1 | -1 | -1 | 1 | 1 | 1 | 1 | 1 | 1 | -1 | 1 | 1 | -1 | 1 | -1 | -1 | 1 | -1 | 1 | -1 | 1 | -1 | 1 | -1 |
| $c_{SS,40,30}$ | -1 | 1 | 1 | -1 | 1 | -1 | 1 | 1 | 1 | -1 | -1 | -1 | 1 | 1 | 1 | -1 | 1 | -1 | 1 | -1 | -1 | 1 | 1 | -1 | 1 | -1 | 1 | 1 | -1 | 1 | 1 | -1 | 1 | 1 | -1 | -1 | -1 | -1 | -1 | -1 |
| $c_{SS,40,31}$ | -1 | 1 | -1 | -1 | -1 | 1 | 1 | 1 | 1 | -1 | 1 | -1 | -1 | -1 | 1 | 1 | -1 | 1 | 1 | -1 | -1 | 1 | -1 | 1 | 1 | 1 | -1 | -1 | 1 | 1 | 1 | -1 | -1 | -1 | -1 | -1 | 1 | -1 | 1 | 1 |
| $c_{SS,40,32}$ | 1 | 1 | 1 | 1 | -1 | -1 | 1 | -1 | 1 | -1 | -1 | 1 | 1 | 1 | -1 | 1 | -1 | -1 | 1 | 1 | -1 | -1 | 1 | 1 | 1 | -1 | -1 | -1 | -1 | -1 | -1 | -1 | 1 | -1 | -1 | 1 | 1 | -1 | 1 | 1 |
| $c_{SS,40,33}$ | -1 | -1 | -1 | -1 | 1 | -1 | 1 | 1 | 1 | -1 | 1 | 1 | 1 | 1 | -1 | 1 | -1 | -1 | -1 | -1 | -1 | 1 | -1 | 1 | -1 | -1 | 1 | -1 | 1 | 1 | -1 | 1 | 1 | -1 | 1 | 1 | 1 | 1 | -1 | -1 |
| $c_{SS,40,34}$ | 1 | -1 | -1 | -1 | 1 | -1 | -1 | 1 | -1 | 1 | 1 | 1 | 1 | 1 | 1 | 1 | 1 | 1 | 1 | -1 | 1 | -1 | 1 | -1 | 1 | -1 | -1 | -1 | -1 | 1 | -1 | -1 | -1 | -1 | -1 | -1 | 1 | 1 | -1 | 1 |
| $c_{SS,40,35}$ | -1 | -1 | 1 | 1 | -1 | -1 | -1 | 1 | 1 | -1 | -1 | 1 | 1 | -1 | 1 | 1 | -1 | 1 | -1 | -1 | 1 | 1 | 1 | 1 | 1 | 1 | 1 | -1 | -1 | -1 | -1 | -1 | -1 | 1 | 1 | -1 | -1 | 1 | 1 | -1 |
| $c_{SS,40,36}$ | -1 | 1 | 1 | 1 | 1 | 1 | -1 | 1 | 1 | -1 | -1 | 1 | -1 | 1 | -1 | -1 | 1 | 1 | -1 | -1 | 1 | 1 | -1 | -1 | 1 | -1 | -1 | 1 | 1 | -1 | -1 | -1 | -1 | -1 | 1 | 1 | 1 | -1 | -1 | 1 |
| $c_{SS,40,37}$ | 1 | -1 | 1 | -1 | 1 | -1 | -1 | -1 | 1 | -1 | -1 | -1 | 1 | -1 | 1 | -1 | -1 | -1 | -1 | 1 | 1 | -1 | -1 | 1 | 1 | 1 | -1 | 1 | 1 | 1 | 1 | -1 | 1 | -1 | 1 | -1 | 1 | 1 | -1 | 1 |
| $c_{SS,40,38}$ | -1 | -1 | 1 | -1 | 1 | 1 | 1 | -1 | -1 | 1 | -1 | -1 | -1 | 1 | -1 | 1 | -1 | 1 | -1 | 1 | -1 | 1 | 1 | 1 | 1 | -1 | -1 | -1 | -1 | 1 | 1 | -1 | -1 | 1 | 1 | 1 | -1 | 1 | -1 | 1 |
| $c_{SS,40,39}$ | -1 | -1 | 1 | -1 | -1 | 1 | -1 | -1 | 1 | -1 | -1 | 1 | -1 | 1 | 1 | 1 | 1 | -1 | 1 | 1 | 1 | 1 | -1 | -1 | -1 | -1 | -1 | -1 | 1 | 1 | -1 | 1 | 1 | 1 | -1 | -1 | -1 | 1 | 1 | 1 |

CODE SEQUENCE AND RADIO STATION

CROSS REFERENCE TO RELATED APPLICATIONS

This application is based on and hereby claims priority to German Application No. 10 2005 006 893.6 filed on Feb. 15, 2005, the contents of which are hereby incorporated by reference.

BACKGROUND

Described below are code sequences and radio stations, especially mobile stations or base stations, which are configured accordingly for the use of the code sequences.

The enormous speed at which technology is developing in the field of mobile radio communication systems has led in recent years to the development and standardization of what is referred to as the third generation of mobile radio systems, especially the UMTS (Universal Mobile Telecommunications System), among the aims of which is to make higher data rates available to the users of mobile stations, such as mobile telephone users for example.

Just in recent months a so-called enhanced up-link has been the focus of these development and standardization activities. This enhanced up-link is intended to provide increased data rates for the connection of a mobile station to a base station. To establish and maintain such an enhanced up-link the signaling channel E-HICH (Enhanced Up-Link Dedicated Channel Hybrid ARQ Indicator Channel) and E-RGCH (Enhanced Up-Link Dedicated Channel Relative Grant Channel) are provided in the direction from the base station to the mobile station.

With the E-HICH an "ACK: Acknowledge" or a "NACK: Not-Acknowledge" is signaled to the mobile station depending on whether a packet has been correctly received by the base station or not.

With the E-RGCH a signal is sent to the mobile station telling it whether it may transmit with the same, a higher or a lower data rate.

The data, especially data bits, which is sent over the signaling channels, especially over the same radio channel, to different mobile stations, is spread for subscriber separation with a code sequence, also called a signature sequence.

Since for example data will be sent to different mobile stations within the same radio channel, it is necessary to stamp onto the different data correspondingly different code sequences, to make it possible for the mobile stations sc to separate the data received via these radio channels and in a mobile station to only further process the data intended for this mobile station.

Whereas the enhanced up-link channel relates to a data transmission from the mobile station to the base station relates, the signaling channels, E-HICH and E-RGCH, describes the direction from the base station to different mobile stations.

For more details see:

R1-041421 "E-HICH/E-RGCH Signature sequence", Ericsson R1-041177, "Downlink Control Signal", Ericsson all of 3GPP, 3rd Generation Partnership Program The aim of further international development efforts is now to specify a set of code sequences or signature sequences which make possible an efficient implementation of these the signaling channels.

SUMMARY

The underlying problem addressed is thus that of specifying a technical teaching which allows an efficient realization of the signaling channels. This is accomplished by specifying code sequences which make efficient implementation of the signaling channels possible.

First, code sequences which are orthogonal to each other are used. This has the advantage that a receiver (for example a mobile station), which correlates its code sequence to a receiver signal sequence which is not intended for it, in the ideal case does not receive any correlation signal. Thus, first is the use of code sequences which form the lines of a Hadamard matrix, since the lines of a Hadamard matrix are orthogonal to each other, proves advantageous.

Hadamard matrices are especially defined as matrices with elements of size 1, of which the lines are orthogonal to each other and of which the columns are orthogonal to each other. Within the framework of the application however the term "Hadamard matrix" is used in a more general way to describe all matrices with elements of size 1, of which the lines are orthogonal to each other.

However, it has been found that the use of the lines of a Hadamard matrix as code sequences for stamping onto data, especially data bits, does not always lead to the desired results in the application case.

Complex investigations and deliberations have led to the knowledge that the use of unfavorable code sequences sometimes leads to an increased transmit power of the base station, if the same value is signaled for all mobile stations on the E-HICH or the E-RGCH (all ACK or all Rate down).

The reason for this is as follows: Bitwise orthogonal sequences are used for the E-HICH and E-RGCH to keep transmissions for different users apart. Known sequences which fulfill the orthogonality requirements can however lead to high demands on the peak power of the base station, if for example the same value is sent at the same time to a number of users (subscribers). This occurs for example if a command for reducing the data rate to all (or many) subscribers who are separated by these sequences, is sent on the respective E-RGCH channels.

The original Hadamard matrix proposed for UMTS is the standard Hadamard matrix employed. It has the property of the first column containing all ones. It can now occur that the same signal is sent to all (or almost all) mobile stations (subscribers or subscriber stations). On the E-HICH the mobile stations are informed whether they may increase their data rate or must decrease it. If the base station is suddenly overloaded by a high volume of data (e.g. because by chance a relatively large number of mobile stations would like to transmit data) the base station will typically order all (or at least quite a few) mobile stations to decrease their data rate in order to reduce the overload as fast as possible. Then (almost) all code sequences multiplied by the same value are added up element-by-element and then sent (in UMTS a further spreading with the spread factor 128 is performed beforehand, but this is not relevant here). This results in a very high value in the first column for the summed elements, which results for the duration of the transmission of these sums in a correspondingly high transmit amplitude and correspondingly high transmit power. This high transmit power or column sum requires correspondingly powerful transmit amplifiers, which are then however only needed for a short time. The result would thus be an inefficient and unnecessarily expensive implementation.

It is thus an aspect to specify code sequences which in this sense result in the lowest possible maximum power requirement. In particular the aim is to minimize the power since the average power is independent of the code sequences selected.

It also turns out that frequency errors, especially the difference between the transmit frequency and the receive frequency as a result of a Doppler shift, reduces or worsens the orthogonality of the code sequences in practical application. This reduction or worsening of the orthogonality of code sequences as a result of a frequency error proves to be especially great if the lines of the known Hadamard matrices are used as code sequences.

A further aspect is thus the knowledge of using code sequences for implementing the aforementioned signaling channels, of which the orthogonality to each other is affected as little as possible by the presence of a frequency error. A set of code sequences, especially of length 40, is thus to be specified, for which it is true that the code sequences are orthogonal to each other and that the maximum of $$E = \sum_i C(s,i)C(e,i) * e^{j2\pi f t(i)} = \sum_i C(s,i)C(e,i) * e^{j2\pi f T i}$$

is small, with the maximum being formed for all possible pairs s and e, with s not equal to e, with C (s,i) being the element of the code matrix in line s and column i and with the total being compiled across all columns of the code matrix.

It is thus especially a further aspect to specify a teaching for forming code matrices which have both good frequency attributes and also good frequency error properties and also have small column sums, meaning that they result in low power maxima in the above sense.

Initially, an aim is to specify code matrices, which with use of the lines of a corresponding code matrix in the sense discussed above result in low power maxima. Furthermore the lines of the code matrix, when used as code sequences (signature sequences), should exhibit good orthogonality properties even with frequency errors.

The first aim can be achieved by individual lines of the (output) Hadamard matrix being multiplied by −1. The multiplication of a line means in this case that each element of the line is multiplied by −1. This does not change the orthogonality properties: The lines of a matrix are orthogonal if the scalar product of all pairs of lines is equal to 0. The scalar product of a line multiplied by −1 is equal to −1 times the original scalar product and thus equal to precisely 0, if the original scalar product is 0. A matrix is thus also orthogonal, if one or more lines are multiplied by −1.

The column sums alter greatly however. This will be illustrated here using the standard-4×4 Hadamard matrix:

| Z0 | 1 | 1 | 1 | 1 |
|---|---|---|---|---|
| Z1 | 1 | −1 | 1 | −1 |
| Z2 | 1 | 1 | −1 | −1 |
| Z3 | 1 | −1 | −1 | 1 |
| Sum | 4 | 0 | 0 | 0 |

This matrix has a column sum of 4 in the first column, else 0.

By comparison the matrix, which results from the above matrix by the line Z1 (characterized by Z1*) being multiplied by −1:

| Z0 | 1 | 1 | 1 | 1 |
|---|---|---|---|---|
| Z1* | −1 | 1 | −1 | 1 |
| Z2 | 1 | 1 | −1 | −1 |
| Z3 | 1 | −1 | −1 | 1 |
| Sum | 2 | 2 | 2 | 2 |

The modified matrix has a total of 2 in all columns. This matrix is also ideal for signaling, since the maximum amplitude on transmission is reduced by the factor 2 (from 4 to 2). The transmit power is thus reduced by the factor 4 or by 65 dB. The fact that this reduced transmit power occurs more often is not a disadvantage in this case: The transmitter must in any event be designed for the maximum power, it is then of no significance how often this power occurs. Only for cooling down is the average power of additional relevance. This average power is the same for both matrices however. Because of energy retention it is equal to the total of the (average) services of all lines. Since the lines are normalized to 1 (or it can be assumed without restricting the generality that they are normalized to 1), the average power is also 4=2ˆ2. The (normal) radiated energy is 4 lines times 4 columns times 1=16. Thus the total of the squares of the column sums must always equal the total of the squares of the matrix elements, in this case 16.

It is thus proved that the modified matrix has the optimum column sum properties for all matrices of size 4.

It is thus an aim, for matrices of size 40, to also determine those with good column sums, to put it more precisely the maximum of the amounts of the column sums should small, especially minimal.

To this end, complex computer-based searches are performed. The problem in this case is that there are 2ˆ40 possibilities to multiply a selection of the 40 lines of the matrix by −1. This is the same as multiplying all lines by the value of −1 or 1. For each selection 40 multiplications and additions must be performed for 40 columns, especially appr. 3.5*10ˆ15 operations Even for these types of powerful workstations, this cannot be done in a short time. A number of optimizations of the computer search have thus been implemented, to bring the search time down to a tolerable limit.

In such cases it has surprisingly been shown that the best solutions are of the type in which 20 column sums are produced with the value of 8 and 20 column sums with the value of 4. Unlike in the example of the 4×4 matrix, no perfectly balanced solution is thus obtained. This can also not be the case at all: The total of the squares of the 40×40 matrix is 40*40*1=1600. This would also have to be the total of the column sums of such a solution, thus the amount of the column sums would then have to be equal to the square root of 1600/40: sqrt(1600/40=sqrt(40)=6.3245. Since the elements of the columns all have the value +1 or −1, the total cannot be an odd number. Since the change of leading sign of an element always modifies the column sum by 2 (−1 instead of +1), and since the original matrix only contains even column sums, any other matrix which arises from multiplication of lines by −1 from the original matrix can only have even column sums. The analysis of the computer search has further revealed that there are no solutions in which the column sum occurs fewer than 20 times, although this could certainly be the case according the square sum criteria. For example one could expect a solution containing, 18 times 8, 6 times 6, 14 times 4 and 2 times 2 as a column sum, since 18*8*8+6*6*6+14*4*4+2*2*2=1600. As revealed by the computer search such a solution or another solution with a lower number of columns with the sum 8 does not exist however.

The construction of a Williamson Hadamard matrix as output (Hadamard matrix) is described below:

Generation of a Hadamard matrix C20 with the length 20 as a so-called Williamson matrix, it can be generated as:

$$C_{20} = \begin{bmatrix} A & A & C & D \\ -C & -D & A & A \\ -A & A & D & -C \\ -D & C & -A & A \end{bmatrix} \text{ or also as: } C'_{20} = \begin{bmatrix} -A & -A & D & C \\ A & -A & -C & D \\ -D & C & -A & A \\ -C & -D & -A & -A \end{bmatrix}$$

with A or C each being 5 by 5 matrices with lines which contain the cyclic transposition of the following [−1 1 1 1 1] or. [1 −1 1 1 −1] and D=2I−C with I representing the 5 times 5 unit matrix, thus D contains the cyclic transpositions of the sequence [1 1 −1 −1 1].

In general a Williamson matrix in this sense contains blocks of elementary matrices, with the elementary matrices containing lines with cyclic transposition.

The Williamson matrix is thus the following matrix with the individual 5-element blocks highlighted:

$$\begin{array}{cccccccccccccccccccc}
-1 & 1 & 1 & 1 & 1 & -1 & 1 & 1 & 1 & 1 & 1 & -1 & 1 & 1 & -1 & 1 & 1 & -1 & -1 & 1 \\
1 & -1 & 1 & 1 & 1 & 1 & -1 & 1 & 1 & 1 & -1 & 1 & -1 & 1 & 1 & 1 & 1 & 1 & -1 & -1 \\
1 & 1 & -1 & 1 & 1 & 1 & 1 & -1 & 1 & 1 & 1 & -1 & 1 & -1 & 1 & -1 & 1 & 1 & 1 & -1 \\
1 & 1 & 1 & -1 & 1 & 1 & 1 & 1 & -1 & 1 & 1 & 1 & -1 & 1 & -1 & -1 & -1 & 1 & 1 & 1 \\
1 & 1 & 1 & 1 & -1 & 1 & 1 & 1 & 1 & -1 & -1 & 1 & 1 & -1 & 1 & 1 & -1 & -1 & 1 & 1 \\
-1 & 1 & -1 & -1 & 1 & -1 & -1 & 1 & 1 & -1 & -1 & 1 & 1 & 1 & 1 & -1 & 1 & 1 & 1 & 1 \\
1 & -1 & 1 & -1 & -1 & -1 & -1 & -1 & 1 & 1 & 1 & -1 & 1 & 1 & 1 & 1 & -1 & 1 & 1 & 1 \\
-1 & 1 & -1 & 1 & -1 & 1 & -1 & -1 & -1 & 1 & 1 & 1 & -1 & 1 & 1 & 1 & 1 & -1 & 1 & 1 \\
-1 & -1 & 1 & -1 & 1 & 1 & 1 & -1 & -1 & -1 & 1 & 1 & 1 & -1 & 1 & 1 & 1 & 1 & -1 & 1 \\
1 & -1 & -1 & 1 & -1 & -1 & 1 & 1 & -1 & -1 & 1 & 1 & 1 & 1 & -1 & 1 & 1 & 1 & 1 & -1 \\
1 & -1 & -1 & -1 & -1 & -1 & 1 & 1 & 1 & 1 & 1 & 1 & -1 & -1 & 1 & -1 & 1 & -1 & -1 & 1 \\
-1 & 1 & -1 & -1 & -1 & 1 & -1 & 1 & 1 & 1 & 1 & 1 & 1 & -1 & -1 & 1 & -1 & 1 & -1 & -1 \\
-1 & -1 & 1 & -1 & -1 & 1 & 1 & -1 & 1 & 1 & -1 & 1 & 1 & 1 & -1 & -1 & 1 & -1 & 1 & -1 \\
-1 & -1 & -1 & 1 & -1 & 1 & 1 & 1 & -1 & 1 & -1 & -1 & 1 & 1 & 1 & -1 & -1 & 1 & -1 & 1 \\
-1 & -1 & -1 & -1 & 1 & 1 & 1 & 1 & 1 & -1 & 1 & -1 & -1 & 1 & 1 & 1 & -1 & -1 & 1 & -1 \\
-1 & -1 & 1 & 1 & -1 & 1 & -1 & 1 & 1 & -1 & 1 & -1 & -1 & -1 & -1 & -1 & 1 & 1 & 1 & 1 \\
-1 & -1 & -1 & 1 & 1 & -1 & 1 & -1 & 1 & 1 & -1 & 1 & -1 & -1 & -1 & 1 & -1 & 1 & 1 & 1 \\
1 & -1 & -1 & -1 & 1 & 1 & -1 & 1 & -1 & 1 & -1 & -1 & 1 & -1 & -1 & 1 & 1 & -1 & 1 & 1 \\
1 & 1 & -1 & -1 & -1 & 1 & 1 & -1 & 1 & -1 & -1 & -1 & -1 & 1 & -1 & 1 & 1 & 1 & -1 & 1 \\
-1 & 1 & 1 & -1 & -1 & -1 & 1 & 1 & -1 & 1 & -1 & -1 & -1 & -1 & 1 & 1 & 1 & 1 & 1 & -1
\end{array}$$

Another option for the generation of a Williamson matrix is the design specification:

$$C'_{20} = \begin{bmatrix} -A & -A & D & C \\ A & -A & -C & D \\ -D & C & -A & A \\ -C & -D & -A & -A \end{bmatrix}$$

This leads to the following matrix C'20, from which likewise in accordance with the formation law a 40*40 matrix can be created:

| | | | | | | | | | | | | | | | | | | | |
|---|---|---|---|---|---|---|---|---|---|---|---|---|---|---|---|---|---|---|---|
| 1 | −1 | −1 | −1 | −1 | 1 | −1 | −1 | −1 | −1 | 1 | 1 | −1 | −1 | 1 | 1 | −1 | 1 | 1 | −1 |
| −1 | 1 | −1 | −1 | −1 | −1 | 1 | −1 | −1 | −1 | 1 | 1 | 1 | −1 | −1 | −1 | 1 | −1 | 1 | 1 |
| −1 | −1 | 1 | −1 | −1 | −1 | −1 | 1 | −1 | −1 | −1 | 1 | 1 | 1 | −1 | 1 | −1 | 1 | −1 | 1 |
| −1 | −1 | −1 | 1 | −1 | −1 | −1 | −1 | 1 | −1 | −1 | −1 | 1 | 1 | 1 | 1 | 1 | −1 | 1 | −1 |
| −1 | −1 | −1 | −1 | 1 | −1 | −1 | −1 | −1 | 1 | 1 | −1 | −1 | 1 | 1 | −1 | 1 | 1 | −1 | 1 |
| −1 | 1 | 1 | 1 | 1 | 1 | −1 | −1 | −1 | −1 | −1 | 1 | −1 | −1 | 1 | 1 | 1 | −1 | −1 | 1 |
| 1 | −1 | 1 | 1 | 1 | −1 | 1 | −1 | −1 | −1 | 1 | −1 | 1 | −1 | −1 | 1 | 1 | 1 | −1 | −1 |
| 1 | 1 | −1 | 1 | 1 | −1 | −1 | 1 | −1 | −1 | −1 | 1 | −1 | 1 | −1 | −1 | 1 | 1 | 1 | −1 |
| 1 | 1 | 1 | −1 | 1 | −1 | −1 | −1 | 1 | −1 | −1 | −1 | 1 | −1 | 1 | −1 | −1 | 1 | 1 | 1 |
| 1 | 1 | 1 | 1 | −1 | −1 | −1 | −1 | −1 | 1 | 1 | −1 | −1 | 1 | −1 | 1 | −1 | −1 | 1 | 1 |
| −1 | −1 | 1 | 1 | −1 | 1 | −1 | 1 | 1 | −1 | 1 | −1 | −1 | −1 | −1 | −1 | 1 | 1 | 1 | 1 |
| −1 | −1 | −1 | 1 | 1 | −1 | 1 | −1 | 1 | 1 | −1 | 1 | −1 | −1 | −1 | 1 | −1 | 1 | 1 | 1 |
| 1 | −1 | −1 | −1 | 1 | 1 | −1 | 1 | −1 | 1 | −1 | −1 | 1 | −1 | −1 | 1 | 1 | −1 | 1 | 1 |
| 1 | 1 | −1 | −1 | −1 | 1 | 1 | −1 | 1 | −1 | −1 | −1 | −1 | 1 | −1 | 1 | 1 | 1 | −1 | 1 |
| −1 | 1 | 1 | −1 | −1 | −1 | 1 | 1 | −1 | 1 | −1 | −1 | −1 | −1 | 1 | 1 | 1 | 1 | 1 | −1 |
| −1 | 1 | −1 | −1 | 1 | −1 | −1 | 1 | 1 | −1 | 1 | −1 | −1 | −1 | −1 | 1 | −1 | −1 | −1 | −1 |
| 1 | −1 | 1 | −1 | −1 | −1 | −1 | −1 | 1 | 1 | −1 | 1 | −1 | −1 | −1 | −1 | 1 | −1 | −1 | −1 |
| −1 | 1 | −1 | 1 | −1 | 1 | −1 | −1 | −1 | 1 | −1 | −1 | 1 | −1 | −1 | −1 | −1 | 1 | −1 | −1 |
| −1 | −1 | 1 | −1 | 1 | 1 | 1 | −1 | −1 | −1 | −1 | −1 | −1 | 1 | −1 | −1 | −1 | −1 | 1 | −1 |
| 1 | −1 | −1 | 1 | −1 | −1 | 1 | 1 | −1 | −1 | −1 | −1 | −1 | −1 | 1 | −1 | −1 | −1 | −1 | 1 |

Then, in accordance with the standard reconstruction, a Hadamard matrix of length 40 is formed from these two matrices:

$$C_{40} = \begin{bmatrix} C_{20} & C_{20} \\ C_{20} & -C_{20} \end{bmatrix}$$

or $$C'_{40} = \begin{bmatrix} C'_{20} & C'_{20} \\ C'_{20} & -C'_{20} \end{bmatrix}$$

In this case is the sum of the columns is no longer 40, as in the original proposed matrix, but only 12. This represents a significant improvement. Further Hadamard matrices are also known from the literature with other construction specifications, but which do not have better properties.

As is evident from the reconstruction of the Williamson Hadamard matrices, the matrix contains blocks of 5×5 matrices which are cyclic permutations of sequences with 5 elements. It is now desirable to obtain this characteristic and still achieve and optimization of the column sums. This characteristic of being made up of cyclic blocks can be obtained if multiplication by −1 also is always applied to such blocks.

The existence of solutions is made possible by the following characteristics of the cyclic 5×5 matrices: Since all 5 lines and all 5 columns of matrices are cyclic transpositions, all columns of these matrices have the same column sum, since the total is actually invariant with cyclic matrices. The individual block matrices have the following column sums:

| 5 × 5 matrix | A | C | D |
|---|---|---|---|
| Column sum | −3 | 1 | 1 |

If entire blocks of lines in each case are now multiplied by −1 (thus always the 5 consecutive lines which belong to the blocks A, C or D), this block structure is obtained. We refer to these operations below as "multiply a line block by −1". The problem can be reduced to the following easier-to-solve problem:

| | | | | | | | |
|---|---|---|---|---|---|---|---|
| −3 | −3 | 1 | 1 | −3 | −3 | 1 | 1 |
| 3 | −3 | −1 | 1 | 3 | −3 | −1 | 1 |
| −1 | 1 | −3 | 3 | −1 | 1 | −3 | 3 |
| −1 | −1 | −3 | −3 | −1 | −1 | −3 | −3 |
| −3 | −3 | 1 | 1 | 3 | 3 | −1 | −1 |
| 3 | −3 | −1 | 1 | −3 | 3 | 1 | −1 |
| −1 | 1 | −3 | 3 | 1 | −1 | 3 | −3 |
| −1 | −1 | −3 | −3 | 1 | 1 | 3 | 3 |
| −4 | −12 | −12 | 4 | 0 | 0 | 0 | 0 |

This table shows in the first 8 columns a matrix of the block column sums. The total column sums are then the sums of the block column sums, multiplied where necessary by −1, if a line block has been multiplied by −1. The column sums which are produced if no line block is multiplied by −1 are entered into the last line of the table.

In this case there are only 2^8=256 different options for multiplying the 8 lines by +1 or −1, which can all be investigated easily, even manually. Evidently the amounts of the column sums do not change if all elements of the matrix, synonymous with all lines or all blocks, are multiplied by −1. This can be exploited so that it can be assumed without restricting the generality that the last block will not be multiplied by −1.

There are now 32 solutions, which are listed in the table below. In this case the columns contain the values by which the corresponding line blocks must be multiplied. The first (left) column in this case stands for the first (topmost) line block. An index is shown in the last column. If it is read as a binary number, the positions with a 1 correspond to the line blocks which will be multiplied by −1.

| | | | | | | | | Index |
|---|---|---|---|---|---|---|---|---|
| −1 | 1 | −1 | 1 | 1 | 1 | 1 | 1 | 5 |
| 1 | −1 | −1 | 1 | 1 | 1 | 1 | 1 | 6 |
| −1 | 1 | 1 | −1 | 1 | 1 | 1 | 1 | 9 |
| 1 | −1 | 1 | −1 | 1 | 1 | 1 | 1 | 11 |
| 1 | 1 | −1 | 1 | −1 | 1 | 1 | 1 | 21 |
| −1 | −1 | −1 | 1 | −1 | 1 | 1 | 1 | 23 |
| 1 | 1 | 1 | −1 | −1 | 1 | 1 | 1 | 24 |
| −1 | −1 | 1 | −1 | −1 | 1 | 1 | 1 | 27 |
| 1 | 1 | −1 | 1 | 1 | −1 | 1 | 1 | 36 |
| −1 | −1 | −1 | 1 | 1 | −1 | 1 | 1 | 39 |
| 1 | 1 | 1 | −1 | 1 | −1 | 1 | 1 | 41 |
| −1 | −1 | 1 | −1 | 1 | −1 | 1 | 1 | 43 |
| −1 | 1 | −1 | 1 | −1 | −1 | 1 | 1 | 53 |
| 1 | −1 | −1 | 1 | −1 | −1 | 1 | 1 | 54 |
| −1 | 1 | 1 | −1 | −1 | −1 | 1 | 1 | 57 |
| 1 | −1 | 1 | −1 | −1 | −1 | 1 | 1 | 58 |
| −1 | 1 | 1 | 1 | 1 | 1 | −1 | 1 | 65 |
| 1 | −1 | 1 | 1 | 1 | 1 | −1 | 1 | 66 |
| −1 | 1 | −1 | −1 | 1 | 1 | −1 | 1 | 77 |
| 1 | −1 | −1 | −1 | 1 | 1 | −1 | 1 | 78 |
| 1 | 1 | 1 | 1 | −1 | 1 | −1 | 1 | 80 |
| −1 | −1 | 1 | 1 | −1 | 1 | −1 | 1 | 83 |
| 1 | 1 | −1 | −1 | −1 | 1 | −1 | 1 | 92 |
| −1 | −1 | −1 | −1 | −1 | 1 | −1 | 1 | 95 |
| 1 | 1 | 1 | 1 | 1 | −1 | −1 | 1 | 96 |
| −1 | −1 | 1 | 1 | 1 | −1 | −1 | 1 | 99 |
| 1 | 1 | −1 | −1 | 1 | −1 | −1 | 1 | 118 |
| −1 | −1 | −1 | −1 | 1 | −1 | −1 | 1 | 111 |
| −1 | 1 | 1 | 1 | −1 | −1 | −1 | 1 | 113 |
| 1 | −1 | 1 | 1 | −1 | −1 | −1 | 1 | 114 |
| −1 | 1 | −1 | −1 | −1 | −1 | −1 | 1 | 125 |
| 1 | −1 | −1 | −1 | −1 | −1 | −1 | 1 | 126 |

The solutions with the indices 6, 24 and 96 stand out in addition because only two line blocks must be multiplied by −1, and that these line blocks are also still adjacent. Only one block of 10 lines must then be multiplied by −1. For the solution with the index 6 the lines 5 to 14 must be multiplied by −1 for example (in this case the convention is applied that the lines of the matrix are sequentially numbered from 0 to 39).

The aim of the optimizations previously presented is to optimize the matrix for the case in which all lines are also actually used, i.e. that the maximum number of connections exists which can be obtained by application of the spread sequences to the matrix. Frequently a system is not utilized to the maximum however. In this case only a subset of the lines are actually used so that only the column sums of these used lines are relevant. The matrices can now be optimized to the extent to which, even for a matrix only used in part, the maximum of the column sums is as small as possible. As well as multiplication of line by −1, lines can also be transposed to find a solution. Line transpositions do not however have to be considered absolutely in the definition of the matrix: Line transpositions mean that the connections are assigned to the line in another sequence. This assignment of the lines to individual connections and especially the selection of the lines which will be used for a given utilization of the system is however still freely selectable in the configuration of the connections by the network.

Note also that although multiplication of line by −1 has an influence on the column sums, there are however also further operations which have no influence on this and also do not adversely affect the orthogonality properties. Thus, a code matrix can be converted with these operations into other code matrices which also have the characteristics described herein. These operations include:

- Transposing the lines of the matrix
- Transposing columns of the matrix
- Reversing the order of the columns or lines of the entire matrix.
- Multiplication of a selection of columns by the constant value −1, etc.

For this reason code matrices which are produced by application of one or more of these operations from code matrices as described, and their use, naturally also fall within the scope of the invention.

These operations can especially be employed to optimize yet further characteristics of the matrices. Since column transpositions do not adversely affect the distribution of the column sums, the distribution of the column sums can also be optimized for these matrices optimized for frequency errors by multiplying the same lines by −1 as for the matrices not optimized for frequency errors. The two optimizations can thus be linked to each other.

Complex simulations with simulation tools developed specifically for this purpose result in code sequences which are described by the lines of a code matrix optimized in this way preserving the orthogonality to each other as well as possible even with a frequency error, and thus making possible for the mobile stations a good separability of signals which are based on a spreading with these types of code sequences. These optimizations result in the following optimized matrix for example.

The code matrix below proves especially suitable which is optimized both with respect to the orthogonality characteristics for frequency errors and also with respect to the column sum criteria (see above):

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | −1 | −1 | −1 | 1 | 1 | −1 | 1 | −1 | 1 | 1 | −1 | −1 | −1 | 1 | −1 | −1 | −1 | −1 | −1 | −1 |
| $C_{ss,40,5}$ | 1 | −1 | 1 | 1 | −1 | −1 | −1 | 1 | −1 | −1 | 1 | −1 | −1 | −1 | 1 | −1 | −1 | −1 | 1 | 1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | 1 | −1 | 1 | −1 | −1 | −1 | 1 | 1 | 1 | 1 | 1 | −1 | −1 | −1 | −1 | 1 | 1 | 1 | −1 | 1 |
| $C_{ss,40,8}$ | −1 | −1 | 1 | −1 | −1 | 1 | −1 | −1 | −1 | −1 | 1 | 1 | 1 | 1 | −1 | 1 | −1 | 1 | −1 | −1 |
| $C_{ss,40,9}$ | 1 | −1 | 1 | 1 | 1 | 1 | −1 | 1 | 1 | 1 | 1 | −1 | 1 | 1 | −1 | −1 | −1 | 1 | −1 | 1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | 1 | 1 | 1 | 1 | −1 | 1 | −1 | −1 | 1 | 1 | 1 | 1 | 1 | −1 | −1 | −1 | 1 | −1 | −1 | −1 |
| $C_{ss,40,13}$ | −1 | −1 | −1 | −1 | 1 | 1 | −1 | 1 | 1 | 1 | −1 | 1 | 1 | −1 | −1 | −1 | 1 | −1 | 1 | 1 |
| $C_{ss,40,14}$ | 1 | −1 | −1 | −1 | 1 | 1 | 1 | 1 | −1 | −1 | −1 | 1 | 1 | −1 | 1 | −1 | −1 | 1 | −1 | 1 |
| $C_{ss,40,15}$ | 1 | 1 | −1 | −1 | 1 | −1 | −1 | −1 | −1 | −1 | −1 | −1 | −1 | −1 | −1 | 1 | −1 | −1 | −1 | −1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | −1 | 1 | −1 | 1 | −1 | −1 | −1 | 1 | −1 | −1 | −1 | 1 | −1 | −1 | −1 | −1 | −1 | 1 | −1 | 1 |
| $C_{ss,40,18}$ | −1 | −1 | 1 | −1 | 1 | −1 | −1 | −1 | −1 | −1 | 1 | −1 | −1 | −1 | −1 | −1 | 1 | 1 | 1 | −1 |

-continued

| | | | | | | | | | | | | | | | | | | | | |
|---|---|---|---|---|---|---|---|---|---|---|---|---|---|---|---|---|---|---|---|---|
| $C_{ss,40,19}$ | −1 | −1 | 1 | −1 | −1 | −1 | 1 | −1 | 1 | 1 | 1 | 1 | −1 | −1 | 1 | −1 | −1 | −1 | −1 | −1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | 1 | −1 | −1 | 1 | 1 | 1 | 1 | −1 | 1 | −1 | 1 | 1 | −1 | 1 | 1 | −1 | −1 | 1 | 1 | 1 |
| $C_{ss,40,22}$ | 1 | 1 | 1 | −1 | 1 | 1 | 1 | −1 | 1 | −1 | −1 | 1 | −1 | −1 | 1 | 1 | 1 | 1 | −1 | 1 |
| $C_{ss,40,23}$ | −1 | 1 | 1 | 1 | 1 | −1 | −1 | −1 | −1 | 1 | −1 | −1 | 1 | 1 | 1 | 1 | −1 | 1 | 1 | 1 |
| $C_{ss,40,24}$ | 1 | 1 | 1 | −1 | −1 | −1 | 1 | 1 | −1 | 1 | −1 | 1 | 1 | 1 | 1 | −1 | −1 | 1 | −1 | −1 |
| $C_{ss,40,25}$ | 1 | −1 | 1 | 1 | −1 | 1 | 1 | 1 | −1 | 1 | −1 | −1 | −1 | 1 | 1 | 1 | 1 | −1 | −1 | −1 |
| $C_{ss,40,26}$ | 1 | 1 | −1 | −1 | −1 | −1 | −1 | −1 | 1 | −1 | 1 | −1 | 1 | 1 | −1 | 1 | 1 | 1 | −1 | 1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | −1 | −1 | 1 | −1 | −1 | −1 | 1 | −1 | −1 | 1 | −1 | 1 | 1 | −1 | −1 | −1 | 1 | 1 | 1 | 1 |
| $C_{ss,40,29}$ | 1 | −1 | 1 | 1 | 1 | −1 | 1 | 1 | 1 | −1 | −1 | −1 | 1 | −1 | −1 | 1 | 1 | 1 | 1 | −1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | 1 | 1 | −1 | 1 | −1 | −1 | −1 | 1 | 1 | −1 | 1 | 1 | 1 | −1 | 1 | −1 | 1 | −1 | 1 | −1 |
| $C_{ss,40,39}$ | 1 | 1 | −1 | 1 | 1 | −1 | 1 | 1 | −1 | 1 | 1 | −1 | 1 | −1 | −1 | −1 | −1 | 1 | −1 | −1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | 1 | −1 | −1 | −1 | 1 | 1 | 1 | −1 | −1 | 1 | −1 | 1 | −1 | 1 | −1 | −1 | 1 | −1 | 1 | 1 |
| $C_{ss,40,5}$ | −1 | 1 | 1 | −1 | 1 | −1 | 1 | −1 | 1 | 1 | −1 | 1 | −1 | 1 | 1 | 1 | 1 | −1 | −1 | 1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | 1 | 1 | −1 | 1 | −1 | −1 | 1 | 1 | −1 | −1 | −1 | −1 | 1 | 1 | −1 | −1 | 1 | −1 | −1 | 1 |
| $C_{ss,40,8}$ | −1 | −1 | 1 | −1 | 1 | 1 | 1 | 1 | 1 | −1 | 1 | 1 | 1 | 1 | −1 | −1 | 1 | −1 | −1 | 1 |
| $C_{ss,40,9}$ | −1 | 1 | 1 | −1 | −1 | 1 | −1 | −1 | 1 | 1 | −1 | −1 | 1 | −1 | −1 | −1 | −1 | −1 | 1 | −1 |
| $C_{ss,40,10}$ | −1 | −1 | −1 | −1 | 1 | −1 | 1 | 1 | −1 | −1 | −1 | 1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | −1 | 1 | −1 | 1 | 1 | −1 | −1 | −1 | −1 | 1 | 1 | 1 | −1 | 1 | −1 | −1 | 1 | 1 | −1 | −1 |
| $C_{ss,40,13}$ | −1 | −1 | 1 | 1 | −1 | −1 | 1 | −1 | 1 | −1 | 1 | −1 | −1 | 1 | 1 | −1 | 1 | −1 | 1 | 1 |
| $C_{ss,40,14}$ | 1 | 1 | −1 | −1 | 1 | −1 | −1 | −1 | −1 | −1 | 1 | 1 | 1 | 1 | −1 | 1 | 1 | −1 | 1 | −1 |
| $C_{ss,40,15}$ | −1 | 1 | 1 | −1 | −1 | −1 | −1 | 1 | 1 | −1 | −1 | −1 | −1 | 1 | −1 | −1 | 1 | 1 | 1 | −1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | −1 | −1 | −1 | −1 | −1 | −1 | 1 | −1 | −1 | 1 | 1 | −1 | 1 | −1 | −1 | −1 | −1 | 1 | −1 | 1 |
| $C_{ss,40,18}$ | −1 | −1 | −1 | 1 | 1 | −1 | −1 | −1 | −1 | −1 | −1 | 1 | 1 | −1 | 1 | −1 | −1 | −1 | 1 | −1 |
| $C_{ss,40,19}$ | 1 | −1 | 1 | −1 | −1 | −1 | −1 | −1 | 1 | −1 | 1 | −1 | −1 | −1 | −1 | 1 | −1 | −1 | −1 | −1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | −1 | −1 | −1 | 1 | 1 | −1 | 1 | 1 | 1 | −1 | −1 | −1 | −1 | 1 | −1 | −1 | −1 | 1 | −1 | −1 |
| $C_{ss,40,22}$ | −1 | −1 | 1 | −1 | −1 | 1 | 1 | −1 | −1 | 1 | −1 | 1 | −1 | −1 | 1 | −1 | 1 | −1 | −1 | −1 |
| $C_{ss,40,23}$ | 1 | 1 | −1 | 1 | −1 | −1 | 1 | −1 | 1 | −1 | 1 | 1 | −1 | −1 | −1 | −1 | 1 | −1 | −1 | −1 |
| $C_{ss,40,24}$ | −1 | −1 | −1 | 1 | −1 | −1 | −1 | 1 | 1 | 1 | −1 | 1 | −1 | 1 | 1 | −1 | −1 | −1 | 1 | 1 |
| $C_{ss,40,25}$ | −1 | −1 | −1 | −1 | 1 | −1 | 1 | −1 | 1 | −1 | 1 | −1 | 1 | −1 | 1 | −1 | 1 | 1 | 1 | −1 |
| $C_{ss,40,26}$ | 1 | −1 | −1 | −1 | 1 | −1 | 1 | −1 | 1 | 1 | 1 | −1 | −1 | 1 | 1 | 1 | −1 | −1 | 1 | −1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | −1 | 1 | −1 | −1 | 1 | 1 | 1 | 1 | 1 | 1 | −1 | −1 | −1 | −1 | −1 | 1 | 1 | 1 | 1 | −1 |
| $C_{ss,40,29}$ | −1 | −1 | −1 | −1 | −1 | 1 | −1 | −1 | 1 | −1 | 1 | 1 | −1 | 1 | −1 | 1 | −1 | 1 | −1 | 1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | 1 | −1 | −1 | −1 | −1 | 1 | 1 | 1 | 1 | −1 | −1 | 1 | 1 | −1 | −1 | −1 | 1 | −1 | 1 | −1 |
| $C_{ss,40,39}$ | −1 | −1 | 1 | 1 | 1 | 1 | 1 | 1 | −1 | −1 | −1 | −1 | −1 | −1 | 1 | 1 | 1 | −1 | −1 | −1 |

For a frequency error of 200 Hz this code matrix has a maximum ancillary correlation of 2.7 in relation to a value of 8.3, which is achieved when a known code matrix is used. That means a suppression for the receipt of transmissions for other mobile stations of appr. 9.5 dB. The maximum ancillary correlation is produced by the worst sequence pair or pairs (code sequence pairs) of the code matrix, with a sequence corresponding to a line of the code matrix. If the elements of the matrix are identified by x(i,k) with i being the line index and k the column index, the ancillary correlation values NC of two lines (code sequences) a and b (a≠b) are calculated from their scalar product taking into account the frequency error, as follows:

$$NC(a, b) = \text{abs}\left(\sum_k x(a, k)x(b, k)\exp(j * 2 * \pi \text{k} * T * f)\right)$$

If lines from this code matrix are used as code sequences for separating the data to be transmitted, this guarantees that the transmitted data is able to be especially well separated on the receive side even if a frequency error is present. This applies especially if the data is sent over the signaling channels from a base station to different mobile stations.

The optimization presented above is especially ideal if the bits created by the spreading (or +1, −1) are sent consecutively in time. This corresponds to what is known as BPSK modulation. When what is referred to as QPSK modulation is used it is also possible to transmit two binary values at the same time. In this case one binary value is transmitted by the I component (real part in-phase component) and the second by the Q component (imaginary part, out-of-phase component) of a complex symbol. If the signals are overlaid for a number of mobile stations the corresponding complex symbols are added, i.e. the I and Q components are added The power at a specific point in time is produced by the power of the complex symbol, this is proportional to the total of the squares of the I and Q components. To obtain the most even possible power distribution it is thus desirable for the total of the squares of consecutive column sums to be as even as possible. As has already been shown, in the case of UMTS it is possible to assume that the amounts of the column sums each assume the value 8 and 4 20 times. A balanced distribution can thus be achieved if the result from the two columns to which one symbol is assigned is that one has the amount 8 and the other the amount 4. 8*8+4*4=64+16=80 is then always produced as the sum of the squares, i.e. a perfectly balanced power distribution. The power distribution is thus perfectly balanced in this case. The pattern of the complex search has now been selected according to whether it has this property. In this case only two patterns were found which are reproduced below:

First Pattern:

1, 1, 1, 1, −1, 1, −1, 1, 1, 1, −1, −1, 1, 1, 1, −1, 1, −1, −1, −1, 1, −1, −1, −1, −1, −1, −1, 1, −1, −1, 1, 1, 1, 1, 1, 1, 1, 1, −1, −1

Second Pattern:

−1, −1, −1, −1, 1, −1, 1, −1, −1, −1, 1, 1, −1, −1, −1, 1, −1, 1, 1, 1, 1, 1, −1, −1, −1, −1, −1, −1, 1, −1, −1, 1, 1, 1, 1, 1, 1, 1, 1, −1, −1

In this case the patterns mean the values (+1 or −1) respectively by which the corresponding lines of the matrix will be multiplied. These values are multiplied by the corresponding lines of the frequency-optimized matrix. This matrix is an optimized matrix whereby, by transposition the columns, the smallest possible maximum of the cross correlations for frequency errors has been obtained.

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | −1 | −1 | −1 | 1 | 1 | −1 | 1 | −1 | 1 | 1 | −1 | −1 | −1 | 1 | −1 | −1 | −1 | −1 | −1 | −1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | −1 | −1 | 1 | 1 | 1 | −1 | −1 | 1 | −1 | −1 | 1 | 1 | −1 | 1 | 1 | 1 | 1 | −1 | −1 | 1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | 1 | −1 | −1 | 1 | −1 | −1 | 1 | −1 | −1 | −1 | −1 | 1 | −1 | 1 | −1 | −1 | 1 | 1 | 1 | −1 |
| $C_{ss,40,11}$ | 1 | −1 | 1 | 1 | 1 | 1 | 1 | −1 | −1 | −1 | 1 | 1 | 1 | −1 | −1 | 1 | −1 | −1 | 1 | −1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | 1 | 1 | −1 | −1 | 1 | −1 | −1 | −1 | −1 | −1 | −1 | −1 | −1 | −1 | −1 | 1 | −1 | −1 | −1 | −1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | −1 | 1 | −1 | 1 | −1 | −1 | −1 | 1 | −1 | −1 | −1 | 1 | −1 | −1 | −1 | −1 | −1 | 1 | −1 | 1 |
| $C_{ss,40,18}$ | −1 | −1 | 1 | −1 | 1 | −1 | −1 | −1 | −1 | −1 | 1 | −1 | −1 | −1 | −1 | −1 | 1 | 1 | 1 | −1 |
| $C_{ss,40,19}$ | −1 | −1 | 1 | −1 | −1 | −1 | 1 | −1 | 1 | 1 | 1 | 1 | −1 | −1 | 1 | −1 | −1 | −1 | −1 | −1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | 1 | −1 | −1 | 1 | 1 | 1 | 1 | −1 | 1 | −1 | 1 | 1 | −1 | 1 | 1 | −1 | −1 | 1 | 1 | 1 |
| $C_{ss,40,22}$ | 1 | 1 | 1 | −1 | 1 | 1 | 1 | −1 | 1 | −1 | −1 | 1 | −1 | −1 | 1 | 1 | 1 | 1 | −1 | 1 |
| $C_{ss,40,23}$ | −1 | 1 | 1 | 1 | 1 | −1 | −1 | −1 | −1 | 1 | −1 | −1 | 1 | 1 | 1 | 1 | −1 | 1 | 1 | 1 |
| $C_{ss,40,24}$ | 1 | 1 | 1 | −1 | −1 | −1 | 1 | 1 | −1 | 1 | −1 | 1 | 1 | 1 | 1 | −1 | −1 | 1 | −1 | −1 |
| $C_{ss,40,25}$ | 1 | −1 | 1 | 1 | −1 | 1 | 1 | 1 | −1 | 1 | −1 | −1 | −1 | 1 | 1 | 1 | 1 | −1 | −1 | −1 |
| $C_{ss,40,26}$ | 1 | 1 | −1 | −1 | −1 | −1 | −1 | −1 | 1 | −1 | 1 | −1 | 1 | 1 | −1 | 1 | 1 | 1 | −1 | 1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | −1 | −1 | 1 | −1 | −1 | −1 | 1 | −1 | −1 | 1 | −1 | 1 | 1 | −1 | −1 | −1 | 1 | 1 | 1 | 1 |
| $C_{ss,40,29}$ | 1 | −1 | 1 | 1 | 1 | −1 | 1 | 1 | 1 | −1 | −1 | −1 | 1 | −1 | −1 | 1 | 1 | 1 | 1 | −1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | 1 | 1 | −1 | 1 | −1 | −1 | −1 | 1 | 1 | −1 | 1 | 1 | 1 | −1 | 1 | −1 | 1 | −1 | 1 | −1 |
| $C_{ss,40,39}$ | 1 | 1 | −1 | 1 | 1 | −1 | 1 | 1 | −1 | 1 | 1 | −1 | 1 | −1 | −1 | −1 | −1 | 1 | −1 | −1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | 1 | −1 | −1 | −1 | 1 | 1 | 1 | −1 | −1 | 1 | −1 | 1 | −1 | 1 | −1 | −1 | 1 | −1 | 1 | 1 |
| $C_{ss,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| $C_{ss,40,6}$ | −1 | −1 | −1 | 1 | −1 | 1 | −1 | 1 | −1 | 1 | 1 | −1 | −1 | 1 | −1 | 1 | 1 | −1 | 1 | −1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | 1 | 1 | 1 | 1 | −1 | 1 | −1 | −1 | 1 | 1 | 1 | −1 | 1 | 1 | 1 | −1 | 1 | −1 | −1 | −1 |
| $C_{ss,40,11}$ | 1 | 1 | −1 | −1 | −1 | −1 | 1 | 1 | −1 | 1 | 1 | −1 | −1 | −1 | 1 | −1 | −1 | −1 | 1 | 1 |

-continued

| | | | | | | | | | | | | | | | | | | | | |
|---|---|---|---|---|---|---|---|---|---|---|---|---|---|---|---|---|---|---|---|---|
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |
| $C_{ss,40,15}$ | −1 | 1 | 1 | −1 | −1 | −1 | −1 | 1 | 1 | −1 | −1 | −1 | −1 | 1 | −1 | −1 | 1 | 1 | 1 | −1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | −1 | −1 | −1 | −1 | −1 | −1 | 1 | −1 | −1 | 1 | 1 | −1 | 1 | −1 | −1 | −1 | −1 | 1 | −1 | 1 |
| $C_{ss,40,18}$ | −1 | −1 | −1 | 1 | 1 | −1 | −1 | −1 | −1 | −1 | −1 | 1 | 1 | −1 | 1 | −1 | −1 | −1 | 1 | −1 |
| $C_{ss,40,19}$ | 1 | −1 | 1 | −1 | −1 | −1 | −1 | −1 | 1 | −1 | 1 | −1 | −1 | −1 | −1 | 1 | −1 | −1 | −1 | −1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | −1 | −1 | −1 | 1 | 1 | −1 | 1 | 1 | 1 | −1 | −1 | −1 | −1 | 1 | −1 | −1 | −1 | 1 | −1 | −1 |
| $C_{ss,40,22}$ | −1 | −1 | 1 | −1 | −1 | 1 | 1 | −1 | −1 | 1 | −1 | 1 | −1 | −1 | 1 | −1 | 1 | −1 | −1 | −1 |
| $C_{ss,40,23}$ | 1 | 1 | −1 | 1 | −1 | −1 | 1 | −1 | 1 | −1 | 1 | 1 | −1 | −1 | −1 | −1 | 1 | −1 | −1 | −1 |
| $C_{ss,40,24}$ | −1 | −1 | −1 | 1 | −1 | −1 | −1 | 1 | 1 | 1 | −1 | 1 | −1 | 1 | 1 | −1 | −1 | −1 | 1 | 1 |
| $C_{ss,40,25}$ | −1 | −1 | −1 | −1 | 1 | −1 | 1 | −1 | 1 | −1 | 1 | −1 | 1 | −1 | 1 | −1 | 1 | 1 | 1 | −1 |
| $C_{ss,40,26}$ | 1 | −1 | −1 | −1 | 1 | −1 | 1 | −1 | 1 | 1 | 1 | −1 | −1 | 1 | 1 | 1 | −1 | −1 | 1 | −1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | −1 | 1 | −1 | −1 | 1 | 1 | 1 | 1 | 1 | 1 | −1 | −1 | −1 | −1 | −1 | 1 | 1 | 1 | 1 | −1 |
| $C_{ss,40,29}$ | −1 | −1 | −1 | −1 | −1 | 1 | −1 | −1 | 1 | −1 | 1 | 1 | −1 | 1 | −1 | 1 | −1 | 1 | −1 | 1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | 1 | −1 | −1 | −1 | −1 | 1 | 1 | 1 | 1 | −1 | −1 | 1 | 1 | −1 | −1 | −1 | 1 | −1 | 1 | −1 |
| $C_{ss,40,39}$ | −1 | −1 | 1 | 1 | 1 | 1 | 1 | 1 | −1 | −1 | 1 | −1 | −1 | −1 | 1 | 1 | 1 | −1 | −1 | −1 |

This then produces the following code matrix if the first pattern is applied to the previous matrix:

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | −1 | −1 | 1 | 1 | −1 | 1 | 1 | 1 | 1 | 1 | 1 | 1 | 1 | 1 | 1 | −1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | 1 | −1 | 1 | −1 | 1 | 1 | 1 | −1 | 1 | 1 | 1 | −1 | 1 | 1 | 1 | 1 | 1 | −1 | 1 | −1 |
| $C_{ss,40,18}$ | 1 | 1 | −1 | 1 | −1 | 1 | 1 | 1 | 1 | 1 | −1 | 1 | 1 | 1 | 1 | 1 | −1 | −1 | −1 | 1 |
| $C_{ss,40,19}$ | 1 | 1 | −1 | 1 | 1 | 1 | −1 | 1 | −1 | −1 | −1 | −1 | 1 | 1 | −1 | 1 | 1 | 1 | 1 | 1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | −1 | 1 | 1 | −1 | −1 | −1 | −1 | 1 | −1 | 1 | −1 | −1 | 1 | −1 | −1 | 1 | 1 | −1 | −1 | −1 |
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | 1 | −1 | 1 | 1 | 1 | 1 | −1 | 1 | 1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |

-continued

| | | | | | | | | | | | | | | | | | | | | |
|---|---|---|---|---|---|---|---|---|---|---|---|---|---|---|---|---|---|---|---|---|
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | −1 | 1 | 1 | 1 | −1 | −1 | −1 | 1 | 1 | −1 | 1 | −1 | 1 | −1 | 1 | 1 | −1 | 1 | −1 | −1 |
| $C_{ss,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | −1 | −1 | −1 | −1 | 1 | −1 | 1 | 1 | −1 | −1 | −1 | 1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |
| $C_{ss,40,15}$ | 1 | −1 | −1 | 1 | 1 | 1 | 1 | −1 | −1 | 1 | 1 | 1 | 1 | −1 | 1 | 1 | −1 | −1 | −1 | 1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | 1 | 1 | 1 | 1 | 1 | 1 | −1 | 1 | 1 | −1 | −1 | 1 | −1 | 1 | 1 | 1 | 1 | −1 | 1 | −1 |
| $C_{ss,40,18}$ | 1 | 1 | 1 | −1 | −1 | 1 | 1 | 1 | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | 1 | −1 | 1 | −1 | 1 | 1 | 1 | 1 | −1 | 1 | 1 | 1 | 1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | 1 | 1 | 1 | −1 | −1 | 1 | −1 | −1 | −1 | 1 | 1 | 1 | 1 | −1 | 1 | 1 | 1 | −1 | 1 | 1 |
| $C_{ss,40,22}$ | 1 | 1 | −1 | 1 | 1 | −1 | −1 | 1 | 1 | −1 | 1 | −1 | 1 | 1 | −1 | 1 | −1 | 1 | 1 | 1 |
| $C_{ss,40,23}$ | −1 | −1 | 1 | −1 | 1 | 1 | −1 | 1 | −1 | 1 | −1 | −1 | 1 | 1 | 1 | 1 | −1 | 1 | 1 | 1 |
| $C_{ss,40,24}$ | 1 | 1 | 1 | −1 | 1 | 1 | 1 | −1 | −1 | −1 | 1 | −1 | 1 | −1 | −1 | 1 | 1 | 1 | −1 | −1 |
| $C_{ss,40,25}$ | 1 | 1 | 1 | 1 | −1 | 1 | −1 | 1 | −1 | 1 | −1 | 1 | −1 | 1 | −1 | 1 | −1 | −1 | −1 | 1 |
| $C_{ss,40,26}$ | −1 | 1 | 1 | 1 | −1 | 1 | −1 | 1 | −1 | −1 | −1 | 1 | 1 | −1 | −1 | −1 | 1 | 1 | −1 | 1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | 1 | −1 | 1 | 1 | −1 | −1 | −1 | −1 | −1 | −1 | 1 | 1 | 1 | 1 | 1 | −1 | −1 | −1 | −1 | 1 |
| $C_{ss,40,29}$ | 1 | 1 | 1 | 1 | 1 | −1 | 1 | 1 | −1 | 1 | −1 | −1 | 1 | −1 | 1 | −1 | 1 | −1 | 1 | −1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | −1 | 1 | 1 | 1 | 1 | −1 | −1 | −1 | −1 | 1 | 1 | −1 | −1 | 1 | 1 | 1 | −1 | 1 | −1 | 1 |
| $C_{ss,40,39}$ | 1 | 1 | −1 | −1 | −1 | −1 | −1 | −1 | 1 | 1 | −1 | 1 | 1 | 1 | −1 | −1 | −1 | 1 | 1 | 1 |

A corresponding other code matrix is produced by application of the second pattern.

The code sequences are used by radio stations; especially base stations and mobile stations, which are suitably configured, especially for implementation or transmission of the above-mentioned signaling channels. In this case the data bits to be transmitted over these signaling channels can be multiplied (spread) on the transmit side for better separability with the code sequences. On the receive side, for better separation of the received signals, the receiver can correlate a code sequence with the received signals, i.e. form correlation sums and perform further processing on these accordingly. The correlation sums are formed for example, as described below, by calculating the receive signal E. One option for further processing is then for example to compare the signal strength with a threshold value. If this is exceeded the receiver knows that the sequence assigned to it (code sequence) has been received and evaluates the information. Using the example of the UMTS E-HICH channel, the information content of the receiver signal is an ACK or NACK of the base station to the mobile station as a response to the data packet sent by the mobile station to the base station on the E-DCH. The information ACK or NACK can be signaled by the prefix of the received signal E.

BRIEF DESCRIPTION OF THE DRAWINGS

These and other objects and advantages will become more apparent and more readily appreciated from the following description of exemplary embodiments, taken in conjunction with the accompanying drawings of which:

FIG. 2 is table a code matrix;

DETAILED DESCRIPTION OF THE PREFERRED EMBODIMENT

Figure 1:
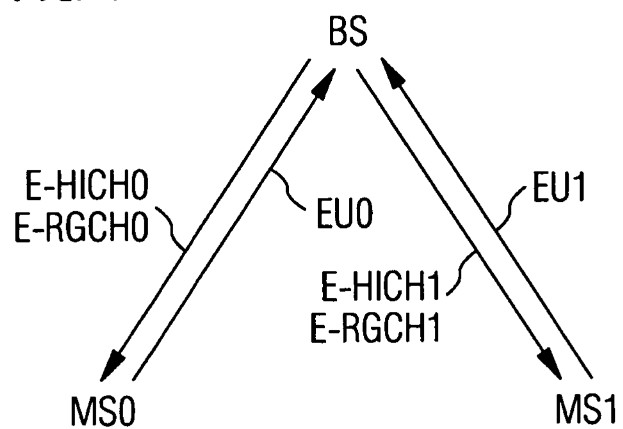
FIG. 1 is a simplified diagram of an up-link or a down-link connection.

Reference will now be made in detail to the preferred embodiments, examples of which are illustrated in the accompanying drawings, wherein like reference numerals refer to like elements throughout.

FIG. 1 shows two (enhanced up-link) packet data channels EU0 and EU1 of two mobile stations MS0 and MS1 to a base station BS of a UMTS system.

To set up or to maintain this type of enhanced up-link the signaling channels E-HICHO and E-HICH1 (Enhanced Up-Link Dedicated Channel Hybrid ARQ Indicator Channel) and E-RGCHO and E-RGCH1 (Enhanced Up-Link Dedicated Channel Relative Grant Channel) are provided in the direction from the base station BS to the mobile stations MS0, MS1.

To make the signaling channels implemented from the base station BS to the mobile stations MS0, MS1 within a radio channel (same time and frequency resource) separable on the receive side for the different mobile stations MS0, MS1, different code sequences are stamped onto the data bits to be transmitted over these signaling channels on the transmit side (base station side).

The radio stations (mobile stations, base stations) are configured as regards hardware, for example by suitable receive and/or transmit stations or by suitable processor devices, and/or as regards software so that for transmission of data in accordance with the code sequences are used, especially data to be sent is multiplied by a code sequence (is spread) or receive signals are correlated with a code sequence.

In addition to the spreading with the code sequences described a further spreading with what are known as OVSF (Orthogonal Variable Spreading Factor) sequences can be performed, since UMTS involves a CDMA system. This spreading is only undertaken at symbol level however, i.e. a very short time interval, so that this spreading only has a negligible influence on the frequency error characteristics and thus is only mentioned at this point for the sake of completeness.

For example a base station features a transmitter for transmitting data to different subscribers and a processor which is configured such that different code sequences are applied to data which is directed to different subscribers, with the code sequences being taken from a code matrix which can be obtained by the following.

Forming a Hadamard matrix of length n;

Multiplication of lines of the Hadamard matrix by −1;

Transposing columns of the Hadamard matrix.

For example a mobile station features a receiver for receiving a receive signal sequence and a process which is configured so that the receive signal sequence is correlated accordingly with one of the above code sequences.

To give them better separability these code sequences should be orthogonal to one another. This means that a receiver (for example a mobile station), which correlates to a line (code sequence), receives no signal if another line (code sequence) was sent:

Then, if the transmitter sends the code sequence s and the receiver is correlated with the code sequence e, the received signal E is:

$$E = \sum_i C(s, i)C(e, i) = 0$$

in this case C(s,i) represents the ith element of the code sequence used on the transmit side and C(e,i) the ith element of the code sequence used on the receive side.

Thus (because the lines of the Hadamard matrix used for the code sequences are orthogonal to each other) transmissions for other users based on the code sequence s do not interfere with the transmissions for a predetermined user who expects data on based on the code sequence e. This perfect orthogonality is lost however if the signals have a frequency error. The following then applies:

$$E = \sum_i C(s, i)C(e, i) * e^{j2\pi f t(i)} = \sum_i C(s, i)C(e, i) * e^{j2\pi fTi} \neq 0$$

In this case f indicates the value of the frequency error, t(i)=Ti is the time at which the ith bit was transmitted, T the duration of a bit. As is usual in signal processing calculation is complex. In this case it is assumed that the ith symbol is sent at time T times i. This is strictly only the case if the bits are transmitted serially after each other. It is also possible for example to transmit two bits in parallel at the same time, for example by application of a so-called I-Q multiplexing method, i.e. in a complex send signal the one bit is sent as a real part and the other as an imaginary part. In this case two bits are transmitted at the same time in each case, so that t (i)_(int (i/2)*2+0, 5)*T. int ( ) here indicates the integer component. The difference between these two cases only amounts to 0.5 T however and is to be ignored in general, so that this fine detail is not discussed below. An equivalent formulation is that the two Bits i and i+1 of the symbol (i/2) are sent at time i*T. The difference between the two nomenclatures is merely an offset of 0.5*T. This offset is irrelevant however, it would only offset the transmission of all symbols, the problem is however invariant in relation to a time shift.

Thus transmissions mutually affect each other, i.e. if data to a mobile station is sent on the basis of the code sequence s, this disturbs the receipt at the mobile station of the data expected on the basis of code sequence e. This disturbance is kept small by using a code sequence as described herein.

It would be optimum if sets (code matrices) of orthogonal sequences (code sequences) could be found which have good characteristics even with the presence of a frequency error. In particular in the worst case the above-mentioned influence should be as small as possible for the worst pair of sequences. The aim is thus to also specify a method for generating such sequences and the application of these sequences for the purposes of transmission.

Quadratic matrices with n orthogonal lines are also called Hadamard matrices. The following formation law for construction of a Hadamard matrix of length 2n from a matrix of length n is generally known and is widely applied:

$$C_{2n} = \begin{bmatrix} C_n & C_n \\ C_n & -C_n \end{bmatrix}$$

Starting from the Hadamard matrix H2 of length 2, matrices can thus be produced of which the length is a power of two:

$$H_2 = \begin{bmatrix} 1 & 1 \\ 1 & -1 \end{bmatrix}$$

Furthermore Hadamard matrices of length 20 are known, from which with this rule matrices of length 80, 160 . . . can be generated.

Figure 3:
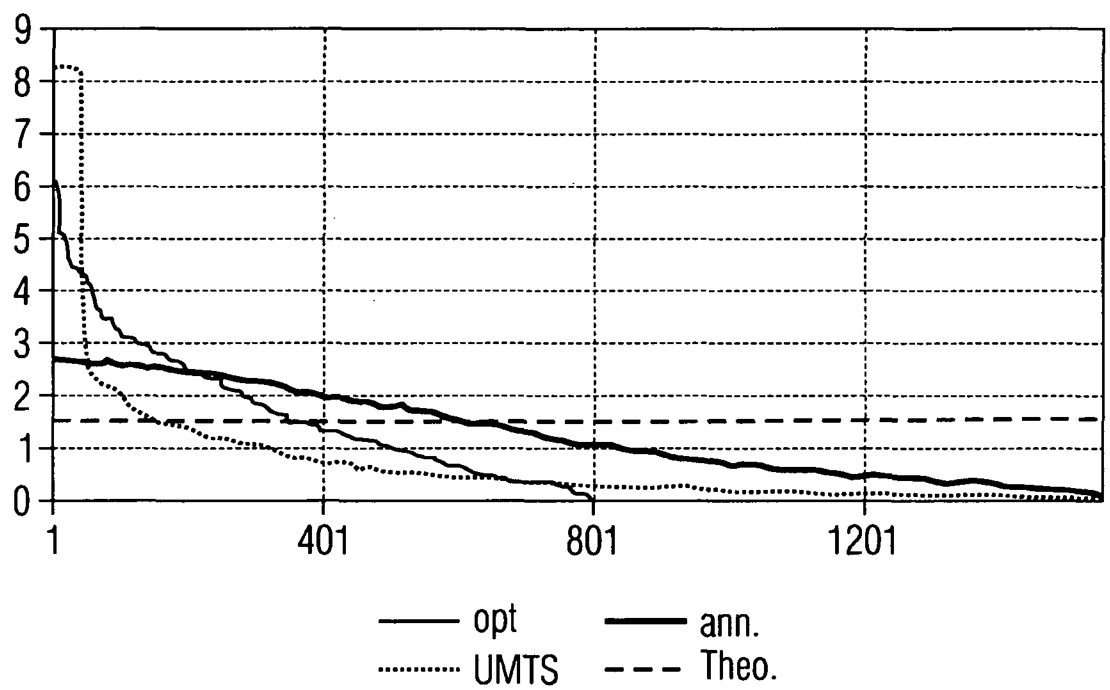
FIG. 3 is graph illustrating a simulation result.

In FIG. 3 the distribution of the correlation for frequency errors is plotted and this is done for the related art (UMTS) and for the method presented with the column transposition shown above (opt) (group even and odd columns). 200 Hz is assumed as a frequency error. The size of the cross correlations are plotted on the y axis, they are sorted in order of size. This means that the x-axis corresponds to the number of the pair for which the cross-correlation was calculated, with this number being assigned to a pair so that the pairs are sorted in accordance with the amount of their cross-correlation.

As shown in FIG. 3 the distribution (ann.) of the correlation sums which this type of optimized code matrix is used, as shown in FIG. 2, is now very well balanced and in particular does not contain any peak at the maximum. The distribution approximates to the theoretical ideal curve (Theo.), in which all ancillary lines would have the same value. In this case each correlation sum would have the value 1.53. This ideal situation is not achievable in practice however because of the large number of theoretical possible correlation pairs. However the optimization allows a value to be achieved which for practical application comes very close to this value.

As can be seen, 40 ancillary lines are produced according to the related art with a value of greater than 8. After the improvement the maximum is only appr. 6 and is additionally reached less often.

It is able to be shown that the total of the squares of all ancillary lines is constant. If the maximum is thus reduced, so the values are inevitably raised for smaller ancillary lines. It is however essentially the maxima which determine the performance of the system. The reason for this is that an error occurs precisely if a received value is falsified by the disturbance of the cross-correlation. This is primarily created by the large ancillary maxima, less by the small ones. Thus the raising of the smaller ancillary lines (cross-correlations) is not only inevitable but also harmless.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A radio station, comprising:

a processor executing an operation including:

generating a code sequence described by a code matrix by selectively multiplying values to produce optimized column sums, the code sequences being orthogonal to each other, the code matrix having a total size of 40×40 squares of a predetermined pattern and a maximum amount for the column sums of the code matrix being maintained subsequent to said multiplying to obtain a minimal amount of cross correlations for frequency errors;

transmitting data to different subscribers by applying the code sequences to the data, the code sequences being taken from the code matrix as follows

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | −1 | −1 | 1 | 1 | −1 | 1 | 1 | 1 | 1 | 1 | 1 | 1 | 1 | 1 | 1 | −1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | 1 | −1 | 1 | −1 | 1 | 1 | 1 | −1 | 1 | 1 | 1 | −1 | 1 | 1 | 1 | 1 | 1 | −1 | 1 | −1 |
| $C_{ss,40,18}$ | 1 | 1 | −1 | 1 | −1 | 1 | 1 | 1 | 1 | 1 | −1 | 1 | 1 | 1 | 1 | 1 | −1 | −1 | −1 | 1 |
| $C_{ss,40,19}$ | 1 | 1 | −1 | 1 | 1 | 1 | −1 | 1 | −1 | −1 | −1 | −1 | 1 | 1 | −1 | 1 | 1 | 1 | 1 | 1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | −1 | 1 | 1 | −1 | −1 | −1 | −1 | 1 | −1 | 1 | −1 | −1 | 1 | −1 | −1 | 1 | 1 | −1 | −1 | −1 |
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | 1 | −1 | 1 | 1 | 1 | 1 | −1 | 1 | 1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | −1 | 1 | 1 | 1 | −1 | −1 | −1 | 1 | 1 | −1 | 1 | −1 | 1 | −1 | 1 | 1 | −1 | 1 | −1 | −1 |
| $C_{ss,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | −1 | −1 | −1 | −1 | 1 | −1 | 1 | 1 | −1 | −1 | −1 | 1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |

-continued

| | | | | | | | | | | | | | | | | | | | | |
|---|---|---|---|---|---|---|---|---|---|---|---|---|---|---|---|---|---|---|---|---|
| $C_{ss,40,15}$ | 1 | −1 | −1 | 1 | 1 | 1 | 1 | −1 | −1 | 1 | 1 | 1 | 1 | −1 | 1 | 1 | −1 | −1 | −1 | 1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | 1 | 1 | 1 | 1 | 1 | 1 | −1 | 1 | 1 | −1 | −1 | 1 | −1 | 1 | 1 | 1 | 1 | −1 | 1 | −1 |
| $C_{ss,40,18}$ | 1 | 1 | 1 | −1 | −1 | 1 | 1 | 1 | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | 1 | −1 | 1 | −1 | 1 | 1 | 1 | 1 | −1 | 1 | 1 | 1 | 1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | 1 | 1 | 1 | −1 | −1 | 1 | −1 | −1 | −1 | 1 | 1 | 1 | 1 | −1 | 1 | 1 | 1 | −1 | 1 | 1 |
| $C_{ss,40,22}$ | 1 | 1 | −1 | 1 | 1 | −1 | −1 | 1 | 1 | −1 | 1 | −1 | 1 | 1 | −1 | 1 | −1 | 1 | 1 | 1 |
| $C_{ss,40,23}$ | −1 | −1 | 1 | −1 | 1 | 1 | −1 | 1 | −1 | 1 | −1 | −1 | 1 | 1 | 1 | 1 | −1 | 1 | 1 | 1 |
| $C_{ss,40,24}$ | 1 | 1 | 1 | −1 | 1 | 1 | 1 | −1 | −1 | −1 | 1 | −1 | 1 | −1 | −1 | 1 | 1 | 1 | −1 | −1 |
| $C_{ss,40,25}$ | 1 | 1 | 1 | 1 | −1 | 1 | −1 | 1 | −1 | 1 | −1 | 1 | −1 | 1 | −1 | 1 | −1 | −1 | −1 | 1 |
| $C_{ss,40,26}$ | −1 | 1 | 1 | 1 | −1 | 1 | −1 | 1 | −1 | −1 | −1 | 1 | 1 | −1 | −1 | −1 | 1 | 1 | −1 | 1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | 1 | −1 | 1 | 1 | −1 | −1 | −1 | −1 | −1 | −1 | 1 | 1 | 1 | 1 | 1 | −1 | −1 | −1 | −1 | 1 |
| $C_{ss,40,29}$ | 1 | 1 | 1 | 1 | 1 | −1 | 1 | 1 | −1 | 1 | −1 | −1 | 1 | −1 | 1 | −1 | 1 | −1 | 1 | −1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | −1 | 1 | 1 | 1 | 1 | −1 | −1 | −1 | −1 | 1 | 1 | −1 | −1 | 1 | 1 | 1 | −1 | 1 | −1 | 1 |
| $C_{ss,40,39}$ | 1 | 1 | −1 | −1 | −1 | −1 | −1 | −1 | 1 | 1 | −1 | 1 | 1 | 1 | −1 | −1 | −1 | 1 | 1 | 1; |

and where application pertaining to the data to be transmitted is performed with code sequences described by a line selected from the code matrix obtained by forming a Hadamard matrix of length n, multiplication of lines of the Hadamard matrix by −1, and transposing columns of the Hadamard matrix.

2. A radio station, comprising:

a processor configured so that a code sequence is applied on data to be transmitted from the radio station, the code sequence described by a row of a code matrix as follows

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | −1 | −1 | 1 | 1 | −1 | 1 | 1 | 1 | 1 | 1 | 1 | 1 | 1 | 1 | 1 | −1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | 1 | −1 | 1 | −1 | 1 | 1 | 1 | −1 | 1 | 1 | 1 | −1 | 1 | 1 | 1 | 1 | 1 | −1 | 1 | −1 |
| $C_{ss,40,18}$ | 1 | 1 | −1 | 1 | −1 | 1 | 1 | 1 | 1 | 1 | −1 | 1 | 1 | 1 | 1 | 1 | −1 | −1 | −1 | 1 |
| $C_{ss,40,19}$ | 1 | 1 | −1 | 1 | 1 | 1 | −1 | 1 | −1 | −1 | −1 | −1 | 1 | 1 | −1 | 1 | 1 | 1 | 1 | 1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | −1 | 1 | 1 | −1 | −1 | −1 | −1 | 1 | −1 | 1 | −1 | −1 | 1 | −1 | −1 | 1 | 1 | −1 | −1 | −1 |
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | 1 | −1 | 1 | 1 | 1 | 1 | −1 | 1 | 1 |

-continued

| | | | | | | | | | | | | | | | | | | | | |
|---|---|---|---|---|---|---|---|---|---|---|---|---|---|---|---|---|---|---|---|---|
| $C_{ss,40,0}$ | -1 | -1 | -1 | -1 | -1 | -1 | -1 | 1 | -1 | 1 | -1 | -1 | 1 | 1 | 1 | 1 | 1 | -1 | -1 | -1 |
| $C_{ss,40,1}$ | 1 | -1 | -1 | -1 | -1 | 1 | -1 | -1 | -1 | -1 | -1 | -1 | -1 | 1 | 1 | -1 | 1 | 1 | -1 | -1 |
| $C_{ss,40,2}$ | 1 | -1 | 1 | 1 | 1 | -1 | -1 | 1 | 1 | 1 | -1 | 1 | -1 | -1 | -1 | -1 | -1 | -1 | -1 | -1 |
| $C_{ss,40,3}$ | -1 | 1 | -1 | -1 | 1 | 1 | -1 | 1 | -1 | -1 | 1 | 1 | -1 | -1 | 1 | -1 | -1 | -1 | -1 | -1 |
| $C_{ss,40,4}$ | -1 | 1 | 1 | 1 | -1 | -1 | -1 | 1 | 1 | -1 | 1 | -1 | 1 | -1 | 1 | 1 | -1 | 1 | -1 | -1 |
| $C_{ss,40,5}$ | 1 | -1 | -1 | 1 | -1 | 1 | -1 | 1 | -1 | -1 | 1 | -1 | 1 | -1 | -1 | -1 | -1 | 1 | 1 | -1 |
| $C_{ss,40,6}$ | 1 | 1 | 1 | -1 | 1 | -1 | 1 | -1 | 1 | -1 | -1 | 1 | 1 | -1 | 1 | -1 | -1 | 1 | -1 | 1 |
| $C_{ss,40,7}$ | -1 | -1 | 1 | -1 | 1 | 1 | -1 | -1 | 1 | 1 | 1 | 1 | -1 | -1 | 1 | 1 | -1 | 1 | 1 | -1 |
| $C_{ss,40,8}$ | 1 | 1 | -1 | 1 | -1 | -1 | -1 | -1 | -1 | 1 | -1 | -1 | -1 | -1 | 1 | 1 | -1 | 1 | 1 | -1 |
| $C_{ss,40,9}$ | 1 | -1 | -1 | 1 | 1 | -1 | 1 | 1 | -1 | -1 | 1 | 1 | -1 | 1 | 1 | 1 | 1 | 1 | -1 | 1 |
| $C_{ss,40,10}$ | -1 | -1 | -1 | -1 | 1 | -1 | 1 | 1 | -1 | -1 | -1 | 1 | -1 | -1 | -1 | 1 | -1 | 1 | 1 | 1 |
| $C_{ss,40,11}$ | -1 | -1 | 1 | 1 | 1 | 1 | -1 | -1 | 1 | -1 | -1 | 1 | 1 | 1 | -1 | 1 | 1 | 1 | -1 | -1 |
| $C_{ss,40,12}$ | 1 | -1 | 1 | -1 | -1 | 1 | 1 | 1 | 1 | -1 | -1 | -1 | 1 | -1 | 1 | 1 | -1 | -1 | 1 | 1 |
| $C_{ss,40,13}$ | 1 | 1 | -1 | -1 | 1 | 1 | -1 | 1 | -1 | 1 | -1 | 1 | 1 | -1 | -1 | 1 | -1 | 1 | -1 | -1 |
| $C_{ss,40,14}$ | -1 | -1 | 1 | 1 | -1 | 1 | 1 | 1 | 1 | 1 | -1 | -1 | -1 | -1 | 1 | -1 | -1 | 1 | -1 | 1 |
| $C_{ss,40,15}$ | 1 | -1 | -1 | 1 | 1 | 1 | 1 | -1 | -1 | 1 | 1 | 1 | 1 | -1 | 1 | 1 | -1 | -1 | -1 | 1 |
| $C_{ss,40,16}$ | -1 | 1 | -1 | 1 | -1 | 1 | 1 | -1 | -1 | -1 | -1 | -1 | -1 | -1 | -1 | 1 | -1 | -1 | -1 | 1 |
| $C_{ss,40,17}$ | 1 | 1 | 1 | 1 | 1 | 1 | -1 | 1 | 1 | -1 | -1 | 1 | -1 | 1 | 1 | 1 | 1 | -1 | 1 | -1 |
| $C_{ss,40,18}$ | 1 | 1 | 1 | -1 | -1 | 1 | 1 | 1 | 1 | 1 | 1 | -1 | -1 | 1 | -1 | 1 | 1 | 1 | -1 | 1 |
| $C_{ss,40,19}$ | -1 | 1 | -1 | 1 | 1 | 1 | 1 | 1 | -1 | 1 | -1 | 1 | 1 | 1 | 1 | -1 | 1 | 1 | 1 | 1 |
| $C_{ss,40,20}$ | 1 | -1 | -1 | 1 | 1 | 1 | 1 | -1 | 1 | 1 | -1 | -1 | 1 | 1 | -1 | 1 | -1 | -1 | -1 | -1 |
| $C_{ss,40,21}$ | 1 | 1 | 1 | -1 | -1 | 1 | -1 | -1 | -1 | 1 | 1 | 1 | 1 | -1 | 1 | 1 | 1 | -1 | 1 | 1 |
| $C_{ss,40,22}$ | 1 | 1 | -1 | 1 | 1 | -1 | -1 | 1 | 1 | -1 | 1 | -1 | 1 | 1 | -1 | 1 | -1 | 1 | 1 | 1 |
| $C_{ss,40,23}$ | -1 | -1 | 1 | -1 | 1 | 1 | -1 | 1 | -1 | 1 | -1 | -1 | 1 | 1 | 1 | 1 | -1 | 1 | 1 | 1 |
| $C_{ss,40,24}$ | 1 | 1 | 1 | -1 | 1 | 1 | 1 | -1 | -1 | -1 | 1 | -1 | 1 | -1 | -1 | 1 | 1 | 1 | -1 | -1 |
| $C_{ss,40,25}$ | 1 | 1 | 1 | 1 | -1 | 1 | -1 | 1 | -1 | 1 | -1 | 1 | -1 | 1 | -1 | 1 | -1 | -1 | -1 | 1 |
| $C_{ss,40,26}$ | -1 | 1 | 1 | 1 | -1 | 1 | -1 | 1 | -1 | -1 | -1 | 1 | 1 | -1 | -1 | -1 | 1 | 1 | -1 | 1 |
| $C_{ss,40,27}$ | 1 | -1 | 1 | 1 | -1 | -1 | 1 | 1 | -1 | 1 | 1 | 1 | -1 | -1 | -1 | 1 | 1 | 1 | 1 | -1 |
| $C_{ss,40,28}$ | 1 | -1 | 1 | 1 | -1 | -1 | -1 | -1 | -1 | -1 | 1 | 1 | 1 | 1 | 1 | -1 | -1 | -1 | -1 | 1 |
| $C_{ss,40,29}$ | 1 | 1 | 1 | 1 | 1 | -1 | 1 | 1 | -1 | 1 | -1 | -1 | 1 | -1 | 1 | -1 | 1 | -1 | 1 | -1 |
| $C_{ss,40,30}$ | -1 | 1 | 1 | -1 | 1 | -1 | 1 | 1 | -1 | 1 | 1 | -1 | 1 | 1 | -1 | -1 | -1 | -1 | -1 | -1 |
| $C_{ss,40,31}$ | -1 | 1 | -1 | 1 | 1 | 1 | -1 | -1 | 1 | 1 | 1 | -1 | -1 | -1 | -1 | -1 | 1 | -1 | 1 | 1 |
| $C_{ss,40,32}$ | -1 | -1 | 1 | 1 | 1 | -1 | -1 | -1 | -1 | -1 | -1 | -1 | 1 | -1 | -1 | 1 | 1 | -1 | 1 | 1 |
| $C_{ss,40,33}$ | -1 | 1 | -1 | 1 | -1 | -1 | 1 | -1 | 1 | 1 | -1 | 1 | 1 | -1 | 1 | 1 | 1 | 1 | -1 | -1 |
| $C_{ss,40,34}$ | 1 | -1 | 1 | -1 | 1 | -1 | -1 | -1 | -1 | 1 | -1 | -1 | -1 | -1 | -1 | -1 | 1 | 1 | -1 | 1 |
| $C_{ss,40,35}$ | 1 | 1 | 1 | 1 | 1 | 1 | 1 | -1 | -1 | -1 | -1 | -1 | -1 | 1 | 1 | -1 | -1 | 1 | 1 | -1 |
| $C_{ss,40,36}$ | 1 | 1 | -1 | -1 | 1 | -1 | -1 | 1 | 1 | -1 | -1 | -1 | -1 | -1 | 1 | 1 | 1 | -1 | -1 | 1 |
| $C_{ss,40,37}$ | 1 | -1 | -1 | 1 | 1 | 1 | -1 | 1 | 1 | 1 | 1 | -1 | 1 | -1 | 1 | -1 | 1 | 1 | -1 | 1 |
| $C_{ss,40,38}$ | -1 | 1 | 1 | 1 | 1 | -1 | -1 | -1 | -1 | 1 | 1 | -1 | -1 | 1 | 1 | 1 | -1 | 1 | -1 | 1 |
| $C_{ss,40,39}$ | 1 | 1 | -1 | -1 | -1 | -1 | -1 | -1 | 1 | 1 | -1 | 1 | 1 | 1 | -1 | -1 | -1 | 1 | 1 | 1; |

and where the code sequence for the data is described by a line selected from the code matrix obtained by forming a Hadamard matrix of length n, multiplication of lines of the Hadamard matrix by −1, and transposing columns of the Hadamard matrix.

3. The radio station as claimed in claim 2, wherein the radio station is a base station.

4. The radio station, as claimed in claim 2, wherein the subscriber stations are mobile stations.

5. The radio station as claimed in claim 4, wherein the radio station is a mobile station.

6. A radio station, comprising:

a send device sending data to various subscriber stations; and a processor coupled to said send device and configured so that the data directed to the subscriber stations is applied with different code sequences which are taken from a code matrix as follows

| | | | | | | | | | | | | | | | | | | | | |
|---|---|---|---|---|---|---|---|---|---|---|---|---|---|---|---|---|---|---|---|---|
| $C_{ss,40,0}$ | -1 | -1 | -1 | 1 | -1 | 1 | -1 | -1 | 1 | 1 | -1 | -1 | 1 | -1 | 1 | 1 | -1 | 1 | 1 | -1 |
| $C_{ss,40,1}$ | -1 | 1 | 1 | -1 | -1 | 1 | 1 | 1 | -1 | -1 | 1 | -1 | 1 | 1 | -1 | -1 | -1 | -1 | 1 | 1 |
| $C_{ss,40,2}$ | -1 | -1 | -1 | 1 | -1 | 1 | 1 | 1 | -1 | -1 | -1 | -1 | 1 | -1 | -1 | 1 | 1 | -1 | -1 | 1 |
| $C_{ss,40,3}$ | 1 | -1 | -1 | -1 | -1 | -1 | -1 | 1 | 1 | 1 | -1 | 1 | -1 | 1 | -1 | 1 | -1 | -1 | 1 | 1 |
| $C_{ss,40,4}$ | 1 | 1 | 1 | -1 | -1 | 1 | -1 | 1 | -1 | -1 | 1 | 1 | 1 | -1 | 1 | 1 | 1 | 1 | 1 | 1 |
| $C_{ss,40,5}$ | -1 | 1 | -1 | -1 | 1 | 1 | 1 | -1 | 1 | 1 | -1 | 1 | 1 | 1 | -1 | 1 | 1 | 1 | -1 | -1 |
| $C_{ss,40,6}$ | 1 | 1 | -1 | -1 | -1 | 1 | 1 | -1 | 1 | 1 | -1 | -1 | 1 | -1 | -1 | -1 | -1 | 1 | 1 | -1 |
| $C_{ss,40,7}$ | -1 | 1 | -1 | 1 | 1 | 1 | -1 | -1 | -1 | -1 | -1 | 1 | 1 | 1 | 1 | -1 | -1 | -1 | 1 | -1 |
| $C_{ss,40,8}$ | 1 | 1 | -1 | 1 | 1 | -1 | 1 | 1 | 1 | 1 | -1 | -1 | -1 | -1 | 1 | -1 | 1 | -1 | 1 | 1 |
| $C_{ss,40,9}$ | -1 | 1 | -1 | -1 | -1 | -1 | 1 | -1 | -1 | -1 | -1 | 1 | -1 | -1 | 1 | 1 | 1 | -1 | 1 | -1 |
| $C_{ss,40,10}$ | -1 | 1 | 1 | -1 | 1 | 1 | -1 | 1 | 1 | 1 | 1 | -1 | 1 | -1 | 1 | 1 | -1 | -1 | -1 | 1 |
| $C_{ss,40,11}$ | -1 | 1 | -1 | -1 | -1 | -1 | -1 | 1 | 1 | 1 | -1 | -1 | -1 | 1 | 1 | -1 | 1 | 1 | -1 | 1 |
| $C_{ss,40,12}$ | -1 | -1 | -1 | -1 | 1 | -1 | 1 | 1 | -1 | -1 | -1 | -1 | -1 | 1 | 1 | 1 | -1 | 1 | 1 | 1 |
| $C_{ss,40,13}$ | 1 | 1 | 1 | 1 | -1 | -1 | 1 | -1 | -1 | -1 | 1 | -1 | -1 | 1 | 1 | 1 | -1 | 1 | -1 | -1 |
| $C_{ss,40,14}$ | -1 | 1 | 1 | 1 | -1 | -1 | -1 | -1 | 1 | 1 | 1 | -1 | -1 | 1 | -1 | 1 | 1 | -1 | 1 | -1 |
| $C_{ss,40,15}$ | -1 | -1 | 1 | 1 | -1 | 1 | 1 | 1 | 1 | 1 | 1 | 1 | 1 | 1 | 1 | -1 | 1 | 1 | 1 | 1 |
| $C_{ss,40,16}$ | 1 | -1 | -1 | -1 | -1 | 1 | -1 | -1 | -1 | -1 | -1 | -1 | 1 | 1 | 1 | -1 | 1 | -1 | -1 | -1 |
| $C_{ss,40,17}$ | 1 | -1 | 1 | -1 | 1 | 1 | 1 | -1 | 1 | 1 | 1 | -1 | 1 | 1 | 1 | 1 | 1 | -1 | 1 | -1 |
| $C_{ss,40,18}$ | 1 | 1 | -1 | 1 | -1 | 1 | 1 | 1 | 1 | 1 | -1 | 1 | 1 | 1 | 1 | 1 | -1 | -1 | -1 | 1 |
| $C_{ss,40,19}$ | 1 | 1 | -1 | 1 | 1 | 1 | -1 | 1 | -1 | -1 | -1 | -1 | 1 | 1 | -1 | 1 | 1 | 1 | 1 | 1 |
| $C_{ss,40,20}$ | 1 | 1 | 1 | -1 | 1 | 1 | -1 | 1 | -1 | 1 | -1 | 1 | -1 | -1 | -1 | 1 | -1 | -1 | 1 | -1 |
| $C_{ss,40,21}$ | -1 | 1 | 1 | -1 | -1 | -1 | -1 | 1 | -1 | 1 | -1 | -1 | 1 | -1 | -1 | 1 | 1 | -1 | -1 | -1 |

-continued

| | | | | | | | | | | | | | | | | | | | | |
|---|---|---|---|---|---|---|---|---|---|---|---|---|---|---|---|---|---|---|---|---|
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | 1 | −1 | −1 | −1 | 1 | −1 | 1 | −1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | 1 | −1 | 1 | 1 | 1 | 1 | −1 | 1 | 1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | −1 | 1 | 1 | 1 | −1 | −1 | −1 | 1 | 1 | −1 | 1 | −1 | 1 | −1 | 1 | 1 | −1 | 1 | −1 | −1 |
| $C_{ss,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | −1 | −1 | −1 | −1 | 1 | −1 | 1 | 1 | −1 | −1 | −1 | 1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |
| $C_{ss,40,15}$ | 1 | −1 | −1 | 1 | 1 | 1 | 1 | −1 | −1 | 1 | 1 | 1 | 1 | −1 | 1 | 1 | −1 | −1 | −1 | 1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | 1 | 1 | 1 | 1 | 1 | 1 | −1 | 1 | 1 | −1 | −1 | 1 | −1 | 1 | 1 | 1 | 1 | −1 | 1 | −1 |
| $C_{ss,40,18}$ | 1 | 1 | 1 | −1 | −1 | 1 | 1 | 1 | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | 1 | −1 | 1 | −1 | 1 | 1 | 1 | 1 | −1 | 1 | 1 | 1 | 1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | 1 | 1 | 1 | −1 | −1 | 1 | −1 | −1 | −1 | 1 | 1 | 1 | 1 | −1 | 1 | 1 | 1 | −1 | 1 | 1 |
| $C_{ss,40,22}$ | 1 | 1 | −1 | 1 | 1 | −1 | −1 | 1 | 1 | −1 | 1 | −1 | 1 | 1 | −1 | 1 | −1 | 1 | 1 | 1 |
| $C_{ss,40,23}$ | −1 | −1 | 1 | −1 | 1 | 1 | −1 | 1 | −1 | 1 | −1 | −1 | 1 | 1 | 1 | 1 | −1 | 1 | 1 | 1 |
| $C_{ss,40,24}$ | 1 | 1 | 1 | −1 | 1 | 1 | 1 | −1 | −1 | −1 | 1 | −1 | 1 | −1 | −1 | 1 | 1 | 1 | −1 | −1 |
| $C_{ss,40,25}$ | 1 | 1 | 1 | 1 | −1 | 1 | −1 | 1 | −1 | 1 | −1 | 1 | −1 | 1 | −1 | 1 | −1 | −1 | −1 | 1 |
| $C_{ss,40,26}$ | −1 | 1 | 1 | 1 | −1 | 1 | −1 | 1 | −1 | −1 | −1 | 1 | 1 | −1 | −1 | −1 | 1 | 1 | −1 | 1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | 1 | −1 | 1 | 1 | −1 | −1 | −1 | −1 | −1 | −1 | 1 | 1 | 1 | 1 | 1 | −1 | −1 | −1 | −1 | 1 |
| $C_{ss,40,29}$ | 1 | 1 | 1 | 1 | 1 | −1 | 1 | 1 | −1 | 1 | −1 | −1 | 1 | −1 | 1 | −1 | 1 | −1 | 1 | −1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | −1 | 1 | 1 | 1 | 1 | −1 | −1 | −1 | −1 | 1 | 1 | −1 | −1 | 1 | 1 | 1 | −1 | 1 | −1 | 1 |
| $C_{ss,40,39}$ | 1 | 1 | −1 | −1 | −1 | −1 | −1 | −1 | 1 | 1 | −1 | 1 | 1 | 1 | −1 | −1 | −1 | 1 | 1 | 1; |

where the different code sequences are selected from a respective line from the code matrix obtained by forming a Hadamard matrix of length n, multiplication of lines of the Hadamard matrix by −1, and transposing columns of the Hadamard matrix; and the data is transmitted to the various subscriber stations.

7. The radio station, as claimed in claim 6, wherein the subscriber stations are mobile stations.

8. A radio station, comprising a receive device receiving a receive signal sequence; and a processor coupled to said receive device and configured so that the receive signal sequence is applied with a code sequence described by a row of a code matrix as follows

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |

-continued

| | | | | | | | | | | | | | | | | | | | | |
|---|---|---|---|---|---|---|---|---|---|---|---|---|---|---|---|---|---|---|---|---|
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | −1 | −1 | 1 | 1 | −1 | 1 | 1 | 1 | 1 | 1 | 1 | 1 | 1 | 1 | 1 | −1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | 1 | −1 | 1 | −1 | 1 | 1 | 1 | −1 | 1 | 1 | 1 | −1 | 1 | 1 | 1 | 1 | 1 | −1 | 1 | −1 |
| $C_{ss,40,18}$ | 1 | 1 | −1 | 1 | −1 | 1 | 1 | 1 | 1 | 1 | −1 | 1 | 1 | 1 | 1 | 1 | −1 | −1 | −1 | 1 |
| $C_{ss,40,19}$ | 1 | 1 | −1 | 1 | 1 | 1 | −1 | 1 | −1 | −1 | −1 | −1 | 1 | 1 | −1 | 1 | 1 | 1 | 1 | 1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | −1 | 1 | 1 | −1 | −1 | −1 | −1 | 1 | −1 | 1 | −1 | −1 | 1 | −1 | −1 | 1 | 1 | −1 | −1 | −1 |
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | 1 | −1 | 1 | 1 | 1 | 1 | −1 | 1 | 1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | −1 | 1 | 1 | 1 | −1 | −1 | −1 | 1 | 1 | −1 | 1 | −1 | 1 | −1 | 1 | 1 | −1 | 1 | −1 | −1 |
| $C_{ss,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | −1 | −1 | −1 | −1 | 1 | −1 | 1 | 1 | −1 | −1 | −1 | 1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |
| $C_{ss,40,15}$ | 1 | −1 | −1 | 1 | 1 | 1 | 1 | −1 | −1 | 1 | 1 | 1 | 1 | −1 | 1 | 1 | −1 | −1 | −1 | 1 |
| $C_{ss,40,16}$ | −1 | 1 | −1 | 1 | −1 | 1 | 1 | −1 | −1 | −1 | −1 | −1 | −1 | −1 | −1 | 1 | −1 | −1 | −1 | 1 |
| $C_{ss,40,17}$ | 1 | 1 | 1 | 1 | 1 | 1 | −1 | 1 | 1 | −1 | −1 | 1 | −1 | 1 | 1 | 1 | 1 | −1 | 1 | −1 |
| $C_{ss,40,18}$ | 1 | 1 | 1 | −1 | −1 | 1 | 1 | 1 | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | 1 | −1 | 1 | −1 | 1 | 1 | 1 | 1 | −1 | 1 | 1 | 1 | 1 |
| $C_{ss,40,20}$ | 1 | −1 | −1 | 1 | 1 | 1 | 1 | −1 | 1 | 1 | −1 | −1 | 1 | 1 | −1 | 1 | −1 | −1 | −1 | −1 |
| $C_{ss,40,21}$ | 1 | 1 | 1 | −1 | −1 | 1 | −1 | −1 | −1 | 1 | 1 | 1 | 1 | −1 | 1 | 1 | 1 | −1 | 1 | 1 |
| $C_{ss,40,22}$ | 1 | 1 | −1 | 1 | 1 | −1 | −1 | 1 | 1 | −1 | 1 | −1 | 1 | 1 | −1 | 1 | −1 | 1 | 1 | 1 |
| $C_{ss,40,23}$ | −1 | −1 | 1 | −1 | 1 | 1 | −1 | 1 | −1 | 1 | −1 | −1 | 1 | 1 | 1 | 1 | −1 | 1 | 1 | 1 |
| $C_{ss,40,24}$ | 1 | 1 | 1 | −1 | 1 | 1 | 1 | −1 | −1 | −1 | 1 | −1 | 1 | −1 | −1 | 1 | 1 | 1 | −1 | −1 |
| $C_{ss,40,25}$ | 1 | 1 | 1 | 1 | −1 | 1 | −1 | 1 | −1 | 1 | −1 | 1 | −1 | 1 | −1 | 1 | −1 | −1 | −1 | 1 |
| $C_{ss,40,26}$ | −1 | 1 | 1 | 1 | −1 | 1 | −1 | 1 | −1 | −1 | −1 | 1 | 1 | −1 | −1 | −1 | 1 | 1 | −1 | 1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | 1 | −1 | 1 | 1 | −1 | −1 | −1 | −1 | −1 | −1 | 1 | 1 | 1 | 1 | 1 | −1 | −1 | −1 | −1 | 1 |
| $C_{ss,40,29}$ | 1 | 1 | 1 | 1 | 1 | −1 | 1 | 1 | −1 | 1 | −1 | −1 | 1 | −1 | 1 | −1 | 1 | −1 | 1 | −1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | 1 | 1 | −1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |
| $C_{ss,40,38}$ | −1 | 1 | 1 | 1 | 1 | −1 | −1 | −1 | −1 | 1 | 1 | −1 | −1 | 1 | 1 | 1 | −1 | 1 | −1 | 1 |
| $C_{ss,40,39}$ | 1 | 1 | −1 | −1 | −1 | −1 | −1 | −1 | 1 | 1 | −1 | 1 | 1 | 1 | −1 | −1 | −1 | 1 | 1 | 1; |

and where application pertaining to data to be transmitted is performed with code sequences described by a line selected from the code matrix obtained by forming a Hadamard matrix of length n, multiplication of lines of the Hadamard matrix by −1, and transposing columns of the Hadamard matrix.

9. A method for transmitting data from a send device to various subscriber stations, comprising:

applying data which is directed to different subscriber stations with different code sequences taken from a code matrix as follows

| | | | | | | | | | | | | | | |
|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 |
| $C_{ss,40,1}$ | −1 | 1 | 1 | −1 | −1 | 1 | 1 | 1 | −1 | −1 | 1 | −1 | 1 | 1 |
| $C_{ss,40,2}$ | −1 | −1 | −1 | 1 | −1 | 1 | 1 | 1 | −1 | −1 | −1 | −1 | 1 | −1 |
| $C_{ss,40,3}$ | 1 | −1 | −1 | −1 | −1 | −1 | −1 | 1 | 1 | 1 | −1 | 1 | −1 | 1 |
| $C_{ss,40,4}$ | 1 | 1 | 1 | −1 | −1 | 1 | −1 | 1 | −1 | −1 | 1 | 1 | 1 | −1 |
| $C_{ss,40,5}$ | −1 | 1 | −1 | −1 | 1 | 1 | 1 | −1 | 1 | 1 | −1 | 1 | 1 | 1 |
| $C_{ss,40,6}$ | 1 | 1 | −1 | −1 | −1 | 1 | 1 | −1 | 1 | 1 | −1 | −1 | 1 | −1 |
| $C_{ss,40,7}$ | −1 | 1 | −1 | 1 | 1 | 1 | −1 | −1 | −1 | −1 | −1 | 1 | 1 | 1 |
| $C_{ss,40,8}$ | 1 | 1 | −1 | 1 | 1 | −1 | 1 | 1 | 1 | 1 | −1 | −1 | −1 | −1 |
| $C_{ss,40,9}$ | −1 | 1 | −1 | −1 | −1 | −1 | 1 | −1 | −1 | −1 | −1 | 1 | −1 | −1 |
| $C_{ss,40,10}$ | −1 | 1 | 1 | −1 | 1 | 1 | −1 | 1 | 1 | 1 | 1 | −1 | 1 | −1 |
| $C_{ss,40,11}$ | −1 | 1 | −1 | −1 | −1 | −1 | −1 | 1 | 1 | 1 | −1 | −1 | −1 | 1 |
| $C_{ss,40,12}$ | −1 | −1 | −1 | −1 | 1 | −1 | 1 | 1 | −1 | −1 | −1 | −1 | −1 | 1 |
| $C_{ss,40,13}$ | 1 | 1 | 1 | 1 | −1 | −1 | 1 | −1 | −1 | −1 | 1 | −1 | −1 | 1 |
| $C_{ss,40,14}$ | −1 | 1 | 1 | 1 | −1 | −1 | −1 | −1 | 1 | 1 | 1 | −1 | −1 | 1 |
| $C_{ss,40,15}$ | −1 | −1 | 1 | 1 | −1 | 1 | 1 | 1 | 1 | 1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 |
| $C_{ss,40,17}$ | 1 | −1 | 1 | −1 | 1 | 1 | 1 | −1 | 1 | 1 | 1 | −1 | 1 | 1 |
| $C_{ss,40,18}$ | 1 | 1 | −1 | 1 | −1 | 1 | 1 | 1 | 1 | 1 | −1 | 1 | 1 | 1 |
| $C_{ss,40,19}$ | 1 | 1 | −1 | 1 | 1 | 1 | −1 | 1 | −1 | −1 | −1 | −1 | 1 | 1 |
| $C_{ss,40,20}$ | 1 | 1 | 1 | −1 | 1 | 1 | −1 | 1 | −1 | 1 | −1 | 1 | −1 | −1 |
| $C_{ss,40,21}$ | −1 | 1 | 1 | −1 | −1 | −1 | −1 | 1 | −1 | 1 | −1 | −1 | 1 | −1 |
| $C_{ss,40,22}$ | −1 | −1 | −1 | 1 | −1 | −1 | −1 | 1 | −1 | 1 | 1 | −1 | 1 | 1 |
| $C_{ss,40,23}$ | 1 | −1 | −1 | −1 | −1 | 1 | 1 | 1 | 1 | −1 | 1 | 1 | −1 | −1 |
| $C_{ss,40,24}$ | −1 | −1 | −1 | 1 | 1 | 1 | −1 | −1 | 1 | −1 | 1 | −1 | −1 | −1 |
| $C_{ss,40,25}$ | −1 | 1 | −1 | −1 | 1 | −1 | −1 | −1 | 1 | −1 | 1 | 1 | 1 | −1 |
| $C_{ss,40,26}$ | −1 | −1 | 1 | 1 | 1 | 1 | 1 | 1 | −1 | 1 | −1 | 1 | −1 | −1 |
| $C_{ss,40,27}$ | 1 | −1 | 1 | −1 | −1 | 1 | −1 | 1 | 1 | −1 | −1 | −1 | −1 | 1 |
| $C_{ss,40,28}$ | 1 | 1 | −1 | 1 | 1 | 1 | −1 | 1 | 1 | −1 | 1 | −1 | −1 | 1 |
| $C_{ss,40,29}$ | −1 | 1 | −1 | −1 | −1 | 1 | −1 | −1 | −1 | 1 | 1 | 1 | −1 | 1 |
| $C_{ss,40,30}$ | −1 | 1 | 1 | −1 | 1 | −1 | 1 | 1 | 1 | −1 | −1 | −1 | 1 | 1 |
| $C_{ss,40,31}$ | −1 | 1 | −1 | −1 | −1 | 1 | 1 | 1 | 1 | −1 | 1 | −1 | −1 | −1 |
| $C_{ss,40,32}$ | 1 | 1 | 1 | 1 | −1 | −1 | 1 | −1 | 1 | −1 | −1 | 1 | 1 | 1 |
| $C_{ss,40,33}$ | −1 | −1 | −1 | −1 | 1 | −1 | 1 | 1 | 1 | −1 | 1 | 1 | 1 | 1 |
| $C_{ss,40,34}$ | 1 | −1 | −1 | −1 | 1 | −1 | −1 | 1 | −1 | 1 | 1 | 1 | 1 | 1 |
| $C_{ss,40,35}$ | −1 | −1 | 1 | 1 | −1 | −1 | −1 | 1 | 1 | −1 | −1 | 1 | 1 | −1 |
| $C_{ss,40,36}$ | −1 | 1 | 1 | 1 | 1 | 1 | −1 | 1 | 1 | −1 | −1 | 1 | −1 | 1 |
| $C_{ss,40,37}$ | 1 | −1 | 1 | −1 | 1 | −1 | −1 | −1 | 1 | −1 | −1 | −1 | 1 | −1 |
| $C_{ss,40,38}$ | −1 | −1 | 1 | −1 | 1 | 1 | 1 | −1 | −1 | 1 | −1 | −1 | −1 | 1 |
| $C_{ss,40,39}$ | −1 | −1 | 1 | −1 | −1 | 1 | −1 | −1 | 1 | −1 | −1 | 1 | −1 | 1 |

| | | | | | | | | | | | | | | |
|---|---|---|---|---|---|---|---|---|---|---|---|---|---|---|
| $C_{ss,40,0}$ | 1 | 1 | −1 | 1 | 1 | −1 | −1 | −1 | −1 | −1 | −1 | −1 | −1 | 1 |
| $C_{ss,40,1}$ | −1 | −1 | −1 | −1 | 1 | 1 | 1 | −1 | −1 | −1 | −1 | 1 | −1 | −1 |
| $C_{ss,40,2}$ | −1 | 1 | 1 | −1 | −1 | 1 | 1 | −1 | 1 | 1 | 1 | −1 | −1 | 1 |
| $C_{ss,40,3}$ | −1 | 1 | −1 | −1 | 1 | 1 | −1 | 1 | −1 | −1 | 1 | 1 | −1 | 1 |
| $C_{ss,40,4}$ | 1 | 1 | 1 | 1 | 1 | 1 | −1 | 1 | 1 | 1 | −1 | −1 | −1 | 1 |
| $C_{ss,40,5}$ | −1 | 1 | 1 | 1 | −1 | −1 | 1 | −1 | −1 | 1 | −1 | 1 | −1 | 1 |
| $C_{ss,40,6}$ | −1 | −1 | −1 | 1 | 1 | −1 | 1 | 1 | 1 | −1 | 1 | −1 | 1 | −1 |
| $C_{ss,40,7}$ | 1 | −1 | −1 | −1 | 1 | −1 | −1 | −1 | 1 | −1 | 1 | 1 | −1 | −1 |
| $C_{ss,40,8}$ | 1 | −1 | 1 | −1 | 1 | 1 | 1 | 1 | −1 | 1 | −1 | −1 | −1 | −1 |
| $C_{ss,40,9}$ | 1 | 1 | 1 | −1 | 1 | −1 | 1 | −1 | −1 | 1 | 1 | −1 | 1 | 1 |
| $C_{ss,40,10}$ | 1 | 1 | −1 | −1 | −1 | 1 | −1 | −1 | −1 | −1 | 1 | −1 | 1 | 1 |
| $C_{ss,40,11}$ | 1 | −1 | 1 | 1 | −1 | 1 | −1 | −1 | 1 | 1 | 1 | 1 | −1 | −1 |
| $C_{ss,40,12}$ | 1 | 1 | −1 | 1 | 1 | 1 | 1 | −1 | 1 | −1 | −1 | 1 | 1 | 1 |
| $C_{ss,40,13}$ | 1 | 1 | −1 | 1 | −1 | −1 | 1 | 1 | −1 | −1 | 1 | 1 | −1 | 1 |
| $C_{ss,40,14}$ | −1 | 1 | 1 | −1 | 1 | −1 | −1 | −1 | 1 | 1 | −1 | 1 | 1 | 1 |
| $C_{ss,40,15}$ | 1 | −1 | 1 | 1 | 1 | 1 | 1 | −1 | −1 | 1 | 1 | 1 | 1 | −1 |
| $C_{ss,40,16}$ | 1 | −1 | 1 | −1 | −1 | −1 | −1 | 1 | −1 | 1 | −1 | 1 | 1 | −1 |
| $C_{ss,40,17}$ | 1 | 1 | 1 | −1 | 1 | −1 | 1 | 1 | 1 | 1 | 1 | 1 | −1 | 1 |
| $C_{ss,40,18}$ | 1 | 1 | −1 | −1 | −1 | 1 | 1 | 1 | 1 | −1 | −1 | 1 | 1 | 1 |
| $C_{ss,40,19}$ | −1 | 1 | 1 | 1 | 1 | 1 | −1 | 1 | −1 | 1 | 1 | 1 | 1 | 1 |
| $C_{ss,40,20}$ | −1 | 1 | −1 | −1 | 1 | −1 | 1 | −1 | −1 | 1 | 1 | 1 | 1 | −1 |
| $C_{ss,40,21}$ | −1 | 1 | 1 | −1 | −1 | −1 | 1 | 1 | 1 | −1 | −1 | 1 | −1 | −1 |
| $C_{ss,40,22}$ | −1 | −1 | −1 | −1 | 1 | −1 | 1 | 1 | −1 | 1 | 1 | −1 | −1 | 1 |
| $C_{ss,40,23}$ | −1 | −1 | 1 | −1 | −1 | −1 | −1 | −1 | 1 | −1 | 1 | 1 | −1 | 1 |
| $C_{ss,40,24}$ | −1 | 1 | 1 | −1 | 1 | 1 | 1 | 1 | 1 | −1 | 1 | 1 | 1 | −1 |
| $C_{ss,40,25}$ | −1 | −1 | −1 | 1 | 1 | 1 | 1 | 1 | 1 | 1 | −1 | 1 | −1 | 1 |
| $C_{ss,40,26}$ | 1 | −1 | −1 | −1 | 1 | −1 | −1 | 1 | 1 | 1 | −1 | 1 | −1 | 1 |
| $C_{ss,40,27}$ | −1 | −1 | −1 | 1 | 1 | −1 | 1 | −1 | 1 | 1 | −1 | −1 | 1 | 1 |
| $C_{ss,40,28}$ | 1 | 1 | −1 | −1 | −1 | −1 | 1 | −1 | 1 | 1 | −1 | −1 | −1 | −1 |
| $C_{ss,40,29}$ | 1 | −1 | −1 | −1 | −1 | 1 | 1 | 1 | 1 | 1 | 1 | −1 | 1 | 1 |
| $C_{ss,40,30}$ | 1 | −1 | 1 | −1 | 1 | −1 | −1 | 1 | 1 | −1 | 1 | −1 | 1 | 1 |
| $C_{ss,40,31}$ | 1 | 1 | −1 | 1 | 1 | −1 | −1 | 1 | −1 | 1 | 1 | 1 | −1 | −1 |
| $C_{ss,40,32}$ | −1 | 1 | −1 | −1 | 1 | 1 | −1 | −1 | 1 | 1 | 1 | −1 | −1 | −1 |
| $C_{ss,40,33}$ | −1 | 1 | −1 | −1 | −1 | −1 | −1 | 1 | −1 | 1 | −1 | −1 | 1 | −1 |
| $C_{ss,40,34}$ | 1 | 1 | 1 | 1 | 1 | −1 | 1 | −1 | 1 | −1 | 1 | −1 | −1 | −1 |
| $C_{ss,40,35}$ | 1 | 1 | −1 | 1 | −1 | −1 | 1 | 1 | 1 | 1 | 1 | 1 | 1 | −1 |
| $C_{ss,40,36}$ | −1 | −1 | 1 | 1 | −1 | −1 | 1 | 1 | −1 | −1 | 1 | −1 | −1 | 1 |
| $C_{ss,40,37}$ | 1 | −1 | −1 | −1 | −1 | 1 | 1 | −1 | −1 | 1 | 1 | 1 | −1 | 1 |
| $C_{ss,40,38}$ | −1 | 1 | −1 | 1 | −1 | 1 | −1 | 1 | 1 | 1 | 1 | −1 | −1 | −1 |
| $C_{ss,40,39}$ | 1 | 1 | 1 | −1 | 1 | 1 | 1 | 1 | −1 | −1 | −1 | −1 | −1 | −1 |

| | | | | | | | | | | | | |
|---|---|---|---|---|---|---|---|---|---|---|---|---|
| $C_{ss,40,0}$ | −1 | 1 | −1 | −1 | 1 | 1 | 1 | 1 | 1 | −1 | −1 | −1 |
| $C_{ss,40,1}$ | −1 | −1 | −1 | −1 | −1 | 1 | 1 | −1 | 1 | 1 | −1 | −1 |
| $C_{ss,40,2}$ | 1 | 1 | −1 | 1 | −1 | −1 | −1 | −1 | −1 | −1 | −1 | −1 |
| $C_{ss,40,3}$ | −1 | −1 | 1 | 1 | −1 | −1 | 1 | −1 | −1 | −1 | −1 | −1 |
| $C_{ss,40,4}$ | 1 | −1 | 1 | −1 | 1 | −1 | 1 | 1 | −1 | 1 | −1 | −1 |
| $C_{ss,40,5}$ | −1 | −1 | 1 | −1 | 1 | −1 | −1 | −1 | −1 | 1 | 1 | −1 |
| $C_{ss,40,6}$ | 1 | −1 | −1 | 1 | 1 | −1 | 1 | −1 | −1 | 1 | −1 | 1 |
| $C_{ss,40,7}$ | 1 | 1 | 1 | 1 | −1 | −1 | 1 | 1 | −1 | 1 | 1 | −1 |
| $C_{ss,40,8}$ | −1 | 1 | −1 | −1 | −1 | −1 | 1 | 1 | −1 | 1 | 1 | −1 |
| $C_{ss,40,9}$ | −1 | −1 | 1 | 1 | −1 | 1 | 1 | 1 | 1 | 1 | −1 | 1 |
| $C_{ss,40,10}$ | −1 | −1 | −1 | 1 | −1 | −1 | −1 | 1 | −1 | 1 | 1 | 1 |
| $C_{ss,40,11}$ | 1 | −1 | −1 | 1 | 1 | 1 | −1 | 1 | 1 | 1 | −1 | −1 |
| $C_{ss,40,12}$ | 1 | −1 | −1 | −1 | 1 | −1 | 1 | 1 | −1 | −1 | 1 | 1 |
| $C_{ss,40,13}$ | −1 | 1 | −1 | 1 | 1 | −1 | −1 | 1 | −1 | 1 | −1 | −1 |
| $C_{ss,40,14}$ | 1 | 1 | −1 | −1 | −1 | −1 | 1 | −1 | −1 | 1 | −1 | 1 |
| $C_{ss,40,15}$ | −1 | 1 | 1 | 1 | 1 | −1 | 1 | 1 | −1 | −1 | −1 | 1 |
| $C_{ss,40,16}$ | −1 | −1 | −1 | −1 | −1 | −1 | −1 | 1 | −1 | −1 | −1 | 1 |
| $C_{ss,40,17}$ | 1 | −1 | −1 | 1 | −1 | 1 | 1 | 1 | 1 | −1 | 1 | −1 |
| $C_{ss,40,18}$ | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | −1 | 1 | 1 | 1 | 1 |
| $C_{ss,40,20}$ | 1 | 1 | −1 | −1 | 1 | 1 | −1 | 1 | −1 | −1 | −1 | −1 |
| $C_{ss,40,21}$ | −1 | 1 | 1 | 1 | 1 | −1 | 1 | 1 | 1 | −1 | 1 | 1 |
| $C_{ss,40,22}$ | 1 | −1 | 1 | −1 | 1 | 1 | −1 | 1 | −1 | 1 | 1 | 1 |
| $C_{ss,40,23}$ | −1 | 1 | −1 | −1 | 1 | 1 | 1 | 1 | −1 | 1 | 1 | 1 |
| $C_{ss,40,24}$ | −1 | −1 | 1 | −1 | 1 | −1 | −1 | 1 | 1 | 1 | −1 | −1 |
| $C_{ss,40,25}$ | −1 | 1 | −1 | 1 | −1 | 1 | −1 | 1 | −1 | −1 | −1 | 1 |
| $C_{ss,40,26}$ | −1 | −1 | −1 | 1 | 1 | −1 | −1 | −1 | 1 | 1 | −1 | 1 |
| $C_{ss,40,27}$ | −1 | 1 | 1 | 1 | −1 | −1 | −1 | 1 | 1 | 1 | 1 | −1 |
| $C_{ss,40,28}$ | −1 | −1 | 1 | 1 | 1 | 1 | 1 | −1 | −1 | −1 | −1 | 1 |
| $C_{ss,40,29}$ | −1 | 1 | −1 | −1 | 1 | −1 | 1 | −1 | 1 | −1 | 1 | −1 |
| $C_{ss,40,30}$ | −1 | 1 | 1 | −1 | 1 | 1 | −1 | −1 | −1 | −1 | −1 | −1 |
| $C_{ss,40,31}$ | 1 | 1 | 1 | −1 | −1 | −1 | −1 | −1 | 1 | −1 | 1 | 1 |
| $C_{ss,40,32}$ | −1 | −1 | −1 | −1 | 1 | −1 | −1 | 1 | 1 | −1 | 1 | 1 |
| $C_{ss,40,33}$ | 1 | 1 | −1 | 1 | 1 | −1 | 1 | 1 | 1 | 1 | −1 | −1 |
| $C_{ss,40,34}$ | −1 | 1 | −1 | −1 | −1 | −1 | −1 | −1 | 1 | 1 | −1 | 1 |
| $C_{ss,40,35}$ | −1 | −1 | −1 | −1 | −1 | 1 | 1 | −1 | −1 | 1 | 1 | −1 |
| $C_{ss,40,36}$ | 1 | −1 | −1 | −1 | −1 | −1 | 1 | 1 | 1 | −1 | −1 | 1 |
| $C_{ss,40,37}$ | 1 | 1 | 1 | −1 | 1 | −1 | 1 | −1 | 1 | 1 | −1 | 1 |
| $C_{ss,40,38}$ | −1 | 1 | 1 | −1 | −1 | 1 | 1 | 1 | −1 | 1 | −1 | 1 |
| $C_{ss,40,39}$ | 1 | 1 | −1 | 1 | 1 | 1 | −1 | −1 | −1 | 1 | 1 | 1; |

where the different code sequences are selected from a respective line from the code matrix obtained by forming a Hadamard matrix of length n, multiplication of lines of the Hadamard matrix by −1, and transposing columns of the Hadamard matrix; and the data is transmitted from the send device to the various subscriber stations.

10. A radio station, comprising:

a processor generating a code sequence described by a row of a code matrix as follows

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{ss,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{ss,40,2}$ | −1 | −1 | −1 | 1 | −1 | 1 | 1 | 1 | −1 | −1 | −1 | −1 | 1 | −1 | −1 | 1 | 1 | −1 | −1 | 1 |
| $C_{ss,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{ss,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{ss,40,5}$ | −1 | 1 | −1 | −1 | 1 | 1 | 1 | −1 | 1 | 1 | −1 | 1 | 1 | 1 | −1 | 1 | 1 | 1 | −1 | −1 |
| $C_{ss,40,6}$ | 1 | 1 | −1 | −1 | −1 | 1 | 1 | −1 | 1 | 1 | −1 | −1 | 1 | −1 | −1 | −1 | −1 | 1 | 1 | −1 |
| $C_{ss,40,7}$ | −1 | 1 | −1 | 1 | 1 | 1 | −1 | −1 | −1 | −1 | −1 | 1 | 1 | 1 | 1 | −1 | −1 | −1 | 1 | −1 |
| $C_{ss,40,8}$ | 1 | 1 | −1 | 1 | 1 | −1 | 1 | 1 | 1 | 1 | −1 | −1 | −1 | −1 | 1 | −1 | 1 | −1 | 1 | 1 |
| $C_{ss,40,9}$ | −1 | 1 | −1 | −1 | −1 | −1 | 1 | −1 | −1 | −1 | −1 | 1 | −1 | −1 | 1 | 1 | 1 | −1 | 1 | −1 |
| $C_{ss,40,10}$ | −1 | 1 | 1 | −1 | 1 | 1 | −1 | 1 | 1 | 1 | 1 | −1 | 1 | −1 | 1 | 1 | −1 | −1 | −1 | 1 |
| $C_{ss,40,11}$ | −1 | 1 | −1 | −1 | −1 | −1 | −1 | 1 | 1 | 1 | −1 | −1 | −1 | 1 | 1 | −1 | 1 | 1 | −1 | 1 |
| $C_{ss,40,12}$ | −1 | −1 | −1 | −1 | 1 | −1 | 1 | 1 | −1 | −1 | −1 | −1 | −1 | 1 | 1 | 1 | −1 | 1 | 1 | 1 |
| $C_{ss,40,13}$ | 1 | 1 | 1 | 1 | −1 | −1 | 1 | −1 | −1 | −1 | 1 | −1 | −1 | 1 | 1 | 1 | −1 | 1 | −1 | −1 |
| $C_{ss,40,14}$ | −1 | 1 | 1 | 1 | −1 | −1 | −1 | −1 | 1 | 1 | 1 | −1 | −1 | 1 | −1 | 1 | 1 | −1 | 1 | −1 |
| $C_{ss,40,15}$ | −1 | −1 | 1 | 1 | 1 | 1 | 1 | 1 | 1 | 1 | 1 | 1 | 1 | 1 | 1 | −1 | 1 | 1 | 1 | 1 |
| $C_{ss,40,16}$ | 1 | −1 | −1 | −1 | −1 | 1 | −1 | −1 | −1 | −1 | −1 | −1 | 1 | 1 | 1 | −1 | 1 | −1 | −1 | −1 |
| $C_{ss,40,17}$ | 1 | −1 | 1 | −1 | 1 | 1 | 1 | −1 | 1 | 1 | 1 | −1 | 1 | 1 | 1 | 1 | 1 | −1 | 1 | −1 |
| $C_{ss,40,18}$ | 1 | 1 | −1 | 1 | −1 | 1 | 1 | 1 | 1 | 1 | −1 | 1 | 1 | 1 | 1 | 1 | −1 | −1 | −1 | 1 |
| $C_{ss,40,19}$ | 1 | 1 | −1 | 1 | 1 | 1 | −1 | 1 | −1 | −1 | −1 | −1 | 1 | 1 | −1 | 1 | 1 | 1 | 1 | 1 |
| $C_{ss,40,20}$ | 1 | 1 | 1 | −1 | 1 | 1 | −1 | 1 | −1 | 1 | −1 | 1 | −1 | −1 | −1 | 1 | −1 | −1 | 1 | −1 |
| $C_{ss,40,21}$ | −1 | 1 | 1 | −1 | −1 | −1 | −1 | 1 | −1 | 1 | −1 | −1 | 1 | −1 | −1 | 1 | 1 | −1 | −1 | −1 |
| $C_{ss,40,22}$ | −1 | −1 | −1 | 1 | −1 | −1 | −1 | 1 | −1 | 1 | 1 | −1 | 1 | 1 | −1 | −1 | −1 | −1 | 1 | −1 |
| $C_{ss,40,23}$ | 1 | −1 | −1 | −1 | −1 | 1 | 1 | 1 | 1 | −1 | 1 | 1 | −1 | −1 | −1 | −1 | 1 | −1 | −1 | −1 |
| $C_{ss,40,24}$ | −1 | −1 | −1 | 1 | 1 | 1 | −1 | −1 | 1 | −1 | 1 | −1 | −1 | −1 | −1 | 1 | 1 | −1 | 1 | 1 |
| $C_{ss,40,25}$ | −1 | 1 | −1 | −1 | 1 | −1 | −1 | −1 | 1 | −1 | 1 | 1 | 1 | −1 | −1 | −1 | −1 | 1 | 1 | 1 |
| $C_{ss,40,26}$ | −1 | −1 | 1 | 1 | 1 | 1 | 1 | 1 | −1 | 1 | −1 | 1 | −1 | −1 | 1 | −1 | −1 | −1 | 1 | −1 |
| $C_{ss,40,27}$ | 1 | −1 | 1 | −1 | −1 | 1 | −1 | 1 | 1 | −1 | −1 | −1 | −1 | 1 | −1 | −1 | −1 | 1 | 1 | −1 |
| $C_{ss,40,28}$ | 1 | 1 | −1 | 1 | 1 | 1 | −1 | 1 | 1 | −1 | 1 | −1 | −1 | 1 | 1 | 1 | −1 | −1 | −1 | −1 |
| $C_{ss,40,29}$ | −1 | 1 | −1 | −1 | −1 | 1 | −1 | −1 | −1 | 1 | 1 | 1 | −1 | 1 | 1 | −1 | −1 | −1 | −1 | 1 |
| $C_{ss,40,30}$ | −1 | 1 | 1 | −1 | 1 | −1 | 1 | 1 | 1 | −1 | −1 | −1 | 1 | 1 | 1 | −1 | 1 | −1 | 1 | −1 |
| $C_{ss,40,31}$ | −1 | 1 | −1 | −1 | −1 | 1 | 1 | 1 | 1 | −1 | 1 | −1 | −1 | −1 | 1 | 1 | −1 | 1 | 1 | −1 |
| $C_{ss,40,32}$ | 1 | 1 | 1 | 1 | −1 | −1 | 1 | −1 | 1 | −1 | −1 | 1 | 1 | 1 | −1 | 1 | −1 | −1 | 1 | 1 |
| $C_{ss,40,33}$ | −1 | −1 | −1 | −1 | 1 | −1 | 1 | 1 | 1 | −1 | 1 | 1 | 1 | 1 | −1 | 1 | −1 | −1 | −1 | −1 |
| $C_{ss,40,34}$ | 1 | −1 | −1 | −1 | 1 | −1 | −1 | 1 | −1 | 1 | 1 | 1 | 1 | 1 | 1 | 1 | 1 | 1 | 1 | −1 |
| $C_{ss,40,35}$ | −1 | −1 | 1 | 1 | −1 | −1 | −1 | 1 | 1 | −1 | −1 | 1 | 1 | −1 | 1 | 1 | −1 | 1 | −1 | −1 |
| $C_{ss,40,36}$ | −1 | 1 | 1 | 1 | 1 | 1 | −1 | 1 | 1 | −1 | −1 | 1 | −1 | 1 | −1 | −1 | 1 | 1 | −1 | −1 |
| $C_{ss,40,37}$ | 1 | −1 | 1 | −1 | 1 | −1 | −1 | −1 | 1 | −1 | −1 | −1 | 1 | −1 | 1 | −1 | −1 | −1 | −1 | 1 |
| $C_{ss,40,38}$ | −1 | −1 | 1 | −1 | 1 | 1 | 1 | −1 | −1 | 1 | −1 | −1 | −1 | 1 | −1 | 1 | −1 | 1 | −1 | 1 |
| $C_{ss,40,39}$ | −1 | −1 | 1 | −1 | −1 | 1 | −1 | −1 | 1 | −1 | −1 | −1 | −1 | 1 | 1 | 1 | 1 | −1 | 1 | 1 |

| | | | | | | | | | | | | | | | | | | | | |
|---|---|---|---|---|---|---|---|---|---|---|---|---|---|---|---|---|---|---|---|---|
| $C_{ss,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{ss,40,1}$ | 1 | −1 | −1 | −1 | −1 | 1 | −1 | −1 | −1 | −1 | −1 | −1 | −1 | 1 | 1 | −1 | 1 | 1 | −1 | −1 |
| $C_{ss,40,2}$ | 1 | −1 | 1 | 1 | 1 | −1 | −1 | 1 | 1 | 1 | −1 | 1 | −1 | −1 | −1 | −1 | −1 | −1 | −1 | −1 |
| $C_{ss,40,3}$ | −1 | 1 | −1 | −1 | 1 | 1 | −1 | 1 | −1 | −1 | 1 | 1 | −1 | −1 | 1 | −1 | −1 | −1 | −1 | −1 |
| $C_{ss,40,4}$ | −1 | 1 | 1 | 1 | −1 | −1 | −1 | 1 | 1 | −1 | 1 | −1 | 1 | −1 | 1 | 1 | −1 | 1 | −1 | −1 |
| $C_{ss,40,5}$ | 1 | 1 | −1 | −1 | −1 | 1 | −1 | 1 | −1 | −1 | 1 | −1 | 1 | −1 | −1 | −1 | −1 | 1 | 1 | −1 |
| $C_{ss,40,6}$ | 1 | 1 | 1 | −1 | 1 | −1 | 1 | −1 | 1 | −1 | −1 | 1 | 1 | −1 | 1 | −1 | −1 | 1 | −1 | 1 |
| $C_{ss,40,7}$ | −1 | −1 | 1 | −1 | 1 | 1 | −1 | −1 | 1 | 1 | 1 | 1 | −1 | −1 | 1 | 1 | −1 | 1 | 1 | −1 |
| $C_{ss,40,8}$ | 1 | 1 | −1 | 1 | −1 | −1 | −1 | −1 | −1 | 1 | −1 | −1 | −1 | −1 | 1 | 1 | −1 | 1 | 1 | −1 |
| $C_{ss,40,9}$ | 1 | −1 | −1 | 1 | 1 | −1 | 1 | 1 | −1 | −1 | 1 | 1 | −1 | 1 | 1 | 1 | 1 | 1 | −1 | 1 |
| $C_{ss,40,10}$ | −1 | −1 | −1 | −1 | 1 | −1 | 1 | 1 | −1 | −1 | −1 | −1 | −1 | −1 | −1 | 1 | −1 | 1 | 1 | 1 |
| $C_{ss,40,11}$ | −1 | −1 | 1 | 1 | 1 | 1 | −1 | −1 | 1 | −1 | −1 | 1 | 1 | 1 | −1 | 1 | 1 | 1 | −1 | −1 |
| $C_{ss,40,12}$ | 1 | −1 | 1 | −1 | −1 | 1 | 1 | 1 | 1 | −1 | −1 | −1 | 1 | −1 | 1 | 1 | −1 | −1 | 1 | 1 |
| $C_{ss,40,13}$ | 1 | 1 | −1 | −1 | 1 | 1 | −1 | 1 | −1 | 1 | −1 | 1 | 1 | −1 | −1 | 1 | −1 | 1 | −1 | −1 |
| $C_{ss,40,14}$ | −1 | −1 | 1 | 1 | −1 | 1 | 1 | 1 | 1 | 1 | −1 | −1 | −1 | −1 | 1 | −1 | −1 | 1 | −1 | 1 |
| $C_{ss,40,15}$ | 1 | −1 | −1 | 1 | 1 | 1 | 1 | −1 | −1 | 1 | 1 | 1 | 1 | −1 | 1 | 1 | −1 | −1 | −1 | 1 |
| $C_{ss,40,16}$ | −1 | 1 | −1 | 1 | −1 | 1 | 1 | −1 | −1 | −1 | −1 | −1 | −1 | −1 | 1 | −1 | 1 | −1 | −1 | 1 |
| $C_{ss,40,17}$ | 1 | 1 | 1 | 1 | 1 | 1 | −1 | 1 | 1 | 1 | −1 | 1 | −1 | 1 | 1 | 1 | 1 | −1 | 1 | −1 |
| $C_{ss,40,18}$ | 1 | 1 | 1 | −1 | −1 | 1 | 1 | 1 | 1 | 1 | 1 | −1 | −1 | 1 | −1 | 1 | 1 | 1 | −1 | 1 |
| $C_{ss,40,19}$ | −1 | 1 | −1 | 1 | 1 | 1 | 1 | 1 | −1 | 1 | −1 | 1 | 1 | 1 | 1 | −1 | 1 | 1 | 1 | 1 |
| $C_{ss,40,20}$ | 1 | 1 | 1 | 1 | 1 | −1 | −1 | −1 | 1 | 1 | −1 | −1 | 1 | 1 | −1 | 1 | −1 | −1 | −1 | −1 |
| $C_{ss,40,21}$ | 1 | 1 | 1 | −1 | −1 | 1 | −1 | −1 | −1 | 1 | 1 | 1 | 1 | −1 | 1 | 1 | 1 | −1 | 1 | 1 |
| $C_{ss,40,22}$ | 1 | 1 | −1 | 1 | 1 | −1 | −1 | 1 | 1 | −1 | 1 | −1 | 1 | 1 | −1 | 1 | −1 | 1 | 1 | 1 |
| $C_{ss,40,23}$ | −1 | −1 | 1 | −1 | 1 | 1 | −1 | 1 | −1 | 1 | −1 | −1 | 1 | 1 | 1 | 1 | −1 | 1 | 1 | 1 |
| $C_{ss,40,24}$ | 1 | 1 | 1 | −1 | 1 | 1 | 1 | −1 | −1 | −1 | 1 | −1 | 1 | −1 | −1 | 1 | 1 | 1 | −1 | −1 |
| $C_{ss,40,25}$ | 1 | 1 | 1 | 1 | −1 | 1 | −1 | 1 | −1 | 1 | −1 | 1 | −1 | 1 | −1 | 1 | −1 | −1 | −1 | 1 |
| $C_{ss,40,26}$ | −1 | 1 | 1 | 1 | −1 | 1 | −1 | 1 | −1 | −1 | −1 | 1 | 1 | −1 | −1 | −1 | 1 | 1 | −1 | 1 |
| $C_{ss,40,27}$ | 1 | −1 | 1 | 1 | −1 | −1 | 1 | 1 | −1 | 1 | 1 | 1 | −1 | −1 | −1 | 1 | 1 | 1 | 1 | −1 |
| $C_{ss,40,28}$ | 1 | −1 | 1 | 1 | −1 | −1 | −1 | −1 | −1 | −1 | 1 | 1 | 1 | 1 | 1 | −1 | −1 | −1 | −1 | 1 |
| $C_{ss,40,29}$ | 1 | 1 | 1 | 1 | 1 | −1 | 1 | 1 | −1 | 1 | −1 | −1 | 1 | −1 | 1 | −1 | 1 | −1 | 1 | −1 |
| $C_{ss,40,30}$ | −1 | 1 | 1 | −1 | 1 | −1 | 1 | 1 | −1 | 1 | 1 | −1 | 1 | 1 | −1 | −1 | −1 | −1 | −1 | −1 |
| $C_{ss,40,31}$ | −1 | 1 | −1 | 1 | 1 | 1 | −1 | −1 | 1 | 1 | 1 | −1 | −1 | −1 | −1 | −1 | 1 | −1 | 1 | 1 |
| $C_{ss,40,32}$ | −1 | −1 | 1 | 1 | 1 | −1 | −1 | −1 | −1 | −1 | −1 | −1 | 1 | −1 | −1 | 1 | 1 | −1 | 1 | 1 |
| $C_{ss,40,33}$ | −1 | 1 | −1 | 1 | −1 | −1 | 1 | −1 | 1 | 1 | −1 | 1 | 1 | −1 | 1 | 1 | 1 | 1 | −1 | −1 |
| $C_{ss,40,34}$ | 1 | −1 | 1 | −1 | 1 | −1 | −1 | −1 | −1 | 1 | −1 | −1 | −1 | −1 | −1 | −1 | −1 | 1 | 1 | 1 |
| $C_{ss,40,35}$ | 1 | 1 | 1 | 1 | 1 | 1 | 1 | −1 | −1 | −1 | −1 | −1 | −1 | 1 | 1 | −1 | −1 | 1 | 1 | −1 |
| $C_{ss,40,36}$ | 1 | 1 | −1 | −1 | 1 | −1 | −1 | 1 | 1 | −1 | −1 | −1 | −1 | −1 | 1 | 1 | 1 | −1 | −1 | 1 |
| $C_{ss,40,37}$ | 1 | −1 | −1 | 1 | 1 | 1 | −1 | 1 | 1 | 1 | 1 | −1 | 1 | −1 | 1 | −1 | 1 | 1 | −1 | 1 |

-continued

| | | | | | | | | | | | | | | | | | | | | |
|---|---|---|---|---|---|---|---|---|---|---|---|---|---|---|---|---|---|---|---|---|
| $C_{ss,40,38}$ | −1 | −1 | 1 | 1 | 1 | −1 | −1 | −1 | −1 | 1 | 1 | −1 | −1 | 1 | 1 | 1 | −1 | 1 | −1 | 1 |
| $C_{ss,40,39}$ | 1 | 1 | 1 | −1 | −1 | −1 | −1 | −1 | 1 | 1 | −1 | 1 | 1 | 1 | −1 | −1 | −1 | 1 | 1 | 1; |

and where application pertaining to data to be transmitted is performed with code sequences described by a line selected from the code matrix obtained by forming a Hadamard matrix of length n, multiplication of lines of the Hadamard matrix by −1, and transposing columns of the Hadamard matrix.

11. The radio station according to claim 10, wherein orthogonality of the code sequences described by the code matrix is maintained including due to a frequency error occurring due to a transmit frequency and a receive frequency.

* * * * *